United States Patent
Mee

(10) Patent No.: US 12,476,831 B2
(45) Date of Patent: Nov. 18, 2025

(54) COMPUTE SERVICES FOR A PLATFORM OF SERVICES ASSOCIATED WITH A BLOCKCHAIN

(71) Applicant: nChain Licensing AG, Zug (CH)

(72) Inventor: Andrew James Mee, London (GB)

(73) Assignee: nChain Licensing AG, Zug (CH)

(*) Notice: Subject to any disclaimer, the term of this patent is extended or adjusted under 35 U.S.C. 154(b) by 616 days.

(21) Appl. No.: 17/800,859

(22) PCT Filed: Feb. 15, 2021

(86) PCT No.: PCT/IB2021/051260
§ 371 (c)(1),
(2) Date: Aug. 18, 2022

(87) PCT Pub. No.: WO2021/165816
PCT Pub. Date: Aug. 26, 2021

(65) Prior Publication Data
US 2023/0095965 A1 Mar. 30, 2023

(30) Foreign Application Priority Data

Feb. 19, 2020 (GB) .................................... 2002285
Sep. 4, 2020 (GB) .................................... 2013929

(51) Int. Cl.
*H04L 9/00* (2022.01)
*H04L 9/06* (2006.01)
(Continued)

(52) U.S. Cl.
CPC .............. *H04L 9/50* (2022.05); *H04L 9/0643* (2013.01); *H04L 9/0825* (2013.01);
(Continued)

(58) Field of Classification Search
CPC ........ H04L 9/50; H04L 9/0643; H04L 9/0825; H04L 67/02; H04L 2209/56;
(Continued)

(56) References Cited

U.S. PATENT DOCUMENTS

2017/0316390 A1 11/2017 Smith et al.
2018/0005186 A1* 1/2018 Hunn ..................... G06F 16/219
(Continued)

FOREIGN PATENT DOCUMENTS

| | | |
|---|---|---|
| JP | 2019522264 A | 8/2019 |
| JP | 2020512757 A | 4/2020 |
| WO | 2019067988 A1 | 4/2019 |

OTHER PUBLICATIONS

Weber Ingo et al: "Untrusted Business Process Monitoring and Execution Using Blockchain", Sep. 8, 2016 (Sep. 8, 2016), ICIAP: International Conference On Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 329-347.
(Continued)

*Primary Examiner* — Shaqueal D Wade-Wright
(74) *Attorney, Agent, or Firm* — Messner Reeves LLP

(57) ABSTRACT

A method is provided for enabling the execution of one or more smart contracts based on a Hypertext Transfer Protocol (HTTP) transmission protocol format request from the client, accessing a smart contract SC in the request and identifying an event stream ES implemented using the blockchain, where the ES is specific to the SC, the ES representing the states of the SC. The current state of the smart contract $ES_n$ is determined and execution of the smart contract SC is invoked. The method invokes updating the ES by processing a new event $E_n$ for the ES, is identified in the received request, and processed by creating a blockchain transaction. The current state of the smart contract on the
(Continued)

blockchain is then updated to be $ES_n=ES_{n+1}$, based on the new event $E_n$. A result associated with updated current state $ES_{n+1}$ is then provided.

21 Claims, 11 Drawing Sheets

(51) Int. Cl.
  *H04L 9/08* (2006.01)
  *H04L 9/32* (2006.01)
  *H04L 67/02* (2022.01)
  *G06Q 10/10* (2023.01)
  *G06Q 20/38* (2012.01)

(52) U.S. Cl.
  CPC ............ *H04L 9/3239* (2013.01); *H04L 67/02* (2013.01); *G06Q 10/10* (2013.01); *G06Q 20/38* (2013.01); *H04L 2209/56* (2013.01)

(58) Field of Classification Search
  CPC ....... H04L 9/3239; G06F 9/542; G06F 9/547; G06Q 20/38; G06Q 20/36; G06Q 10/10; G06Q 20/065; G06Q 20/367
  See application file for complete search history.

(56) References Cited

U.S. PATENT DOCUMENTS

| | | | |
|---|---|---|---|
| 2019/0108140 A1* | 4/2019 | Deshpande | G06F 12/1408 |
| 2019/0180276 A1* | 6/2019 | Lee | H04L 9/3247 |
| 2020/0034448 A1* | 1/2020 | Sato | H04L 9/50 |
| 2020/0044857 A1* | 2/2020 | Snow | G06Q 20/367 |
| 2020/0082349 A1* | 3/2020 | Maio | G06Q 10/1091 |
| 2020/0242593 A1* | 7/2020 | Deshpande | H04L 9/3247 |
| 2024/0370866 A1* | 11/2024 | Rand | H04L 9/50 |

OTHER PUBLICATIONS

Orlenys Lopez-Pintado et al: "Caterpillar: A Business Process Execution Engine on the Ethereum Blockchain", Arxiv.org, Cornell University Library, 201 Olin Library Cornell University Ithaca, NY 14853, Jul. 10, 2018 (Jul. 10, 2018).

PCT/IB2021051260 International Search Report and Written Opinion dated Apr. 23, 2021.

* cited by examiner

COMPUTE SERVICES FOR A PLATFORM OF SERVICES ASSOCIATED WITH A BLOCKCHAIN

CROSS REFERENCE TO RELATED APPLICATIONS

This application is the U.S. National Stage of International Application No. PCT/I62021/051260 filed on Feb. 15, 2021, which claims the benefit of United Kingdom Patent Application No. 2002285.1, filed on Feb. 19, 2020, and United Kingdom Patent Application No. 2013929.1, filed on Sep. 4, 2020, the contents of which are incorporated herein by reference in their entireties.

TECHNICAL FIELD

This disclosure relates generally to methods and systems for implementing a platform of one or more services associated with a distributed ledger, i.e. a blockchain, for one or more clients. Particularly, the present disclosure relates, but is not limited to, the provision of access to a plurality functions and applications associated with a blockchain for one or more clients, such as the implementation of event streams or machine-readable contracts.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software licence, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licences, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

Accordingly, there is a desire to implement secure, low-complexity, user-friendly, efficient, and robust techniques, that will allow any client, whether computationally sophisticated or not, to be able to instantaneously access and interact with useful applications associated with the blockchain, in a simple, fast, accurate, reliable, and secure manner, that is computationally and functionally less onerous. More particularly, there is a desire to make use of distributed ledger (blockchain) technology, and the advantages of increased security, transparency, and reliability of records, to provide a common platform or interface for a plurality of blockchain related services or applications, that enable any client computing device to ensure any data, event, or digital asset associated with the client, can be instantaneously and securely mined, or written into the blockchain easily, thereby providing a lasting, tamper-proof, and auditable record of it, which can be created, written, updated, read, or viewed as required.

Such an improved solution has now been devised. The present disclosure addresses the above technical concerns by proposing one or more techniques, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain.

SUMMARY

In a first aspect, the present disclosure proposes methods, devices, and systems for implementing or providing a compute or software execution service for transactions associated with a blockchain for a client. In more detail, the present disclosure relates to a method for enabling the execution of one or more smart contracts based on a Hypertext Transfer Protocol (HTTP) transmission protocol format (HTTP) request from the client. The method includes accessing a smart contract SC in the request and identifying an event stream ES implemented using the blockchain, where the event stream ES is specific to the smart contract SC, the event stream ES representing the states of the smart contract SC. The current state of the smart contract $ES_n$ is determined. The method then includes invoking execution of the smart contract SC. Then, the method invokes updating the event stream ES by processing a new event $E_n$ for the event stream $ES_n$ is identified in the received request, and processed by creating a blockchain transaction. The current state of the smart contract on the blockchain is then updated to be $ES_n=ES_{n+1}$, based on the new event $E_n$. A result associated with updated current state $ES_{n+1}$ is then provided.

In a second aspect the present disclosure proposes methods, devices, and systems for accessing a smart contract associated with a blockchain. In more detail, the method of the second aspect comprising the steps of obtaining or identifying endpoint associated with a platform for executing a smart contract SC, and sending a request for one or more events $E_n$ pertaining to the smart contract SC to the platform, wherein the request is sent based on a HTTP format. The method includes obtaining one or more software libraries and verification tools for processing data associated with the smart contract SC. The method also includes receiving a result that is based on an output script of a blockchain transaction pertaining to the requested event $E_n$, said result representing an updated state of the smart contract SC, the result being received using a HTTP format.

Throughout this specification the word "comprise", or variations such as "includes", "comprises", or "comprising", will be understood to imply the inclusion of a stated element, integer, step, or group of elements, integers, or steps, but not the exclusion of any other element, integer, step, or group of elements, integers, or steps.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1:
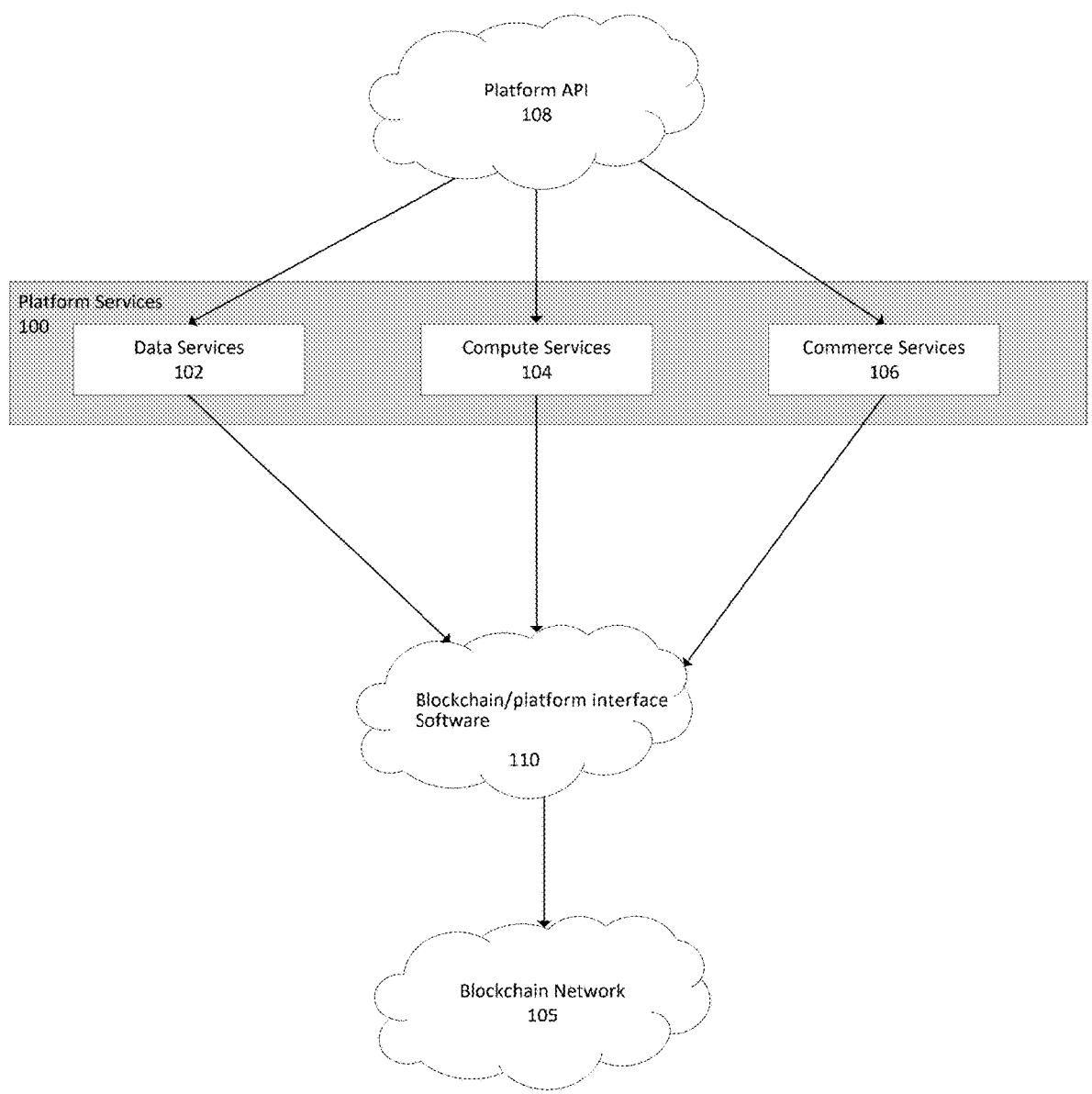
FIG. 1 is a schematic diagram, illustrating an overview of a platform for a plurality of services associated with a blockchain.

The present disclosure relates generally to the provision of a platform of a plurality of services that are associated with a blockchain, the platform being provided for a plurality of clients, and implemented by at least one platform processor associated with an application programming interface (API). An example of such a platform of a plurality of services is set out in UK patent application number 2002285.1 filed on 19 Feb. 2020 by nChain Holdings Limited.

Advantageously, such a platform processor API allows for web-based interaction interface, i.e. it may be implemented as a web service for the one or more clients, such that communication may take place over the Internet using standard Internet communication protocols for web-based services. For instance, HTTP messages or requests in an application level, or layer between a client and a server (the platform service in this case), such as HTTP, HTTPS etc. may be transmitted and received based on transport layer protocols, such as TCP/IP etc. The reference to HTTP transmission protocols, or HTTP API, herein also encapsulates all standard Internet communication protocols, such as TCP/IP, UDP, HTTPS, etc.

The platform processor may be implemented as or associated with an HTTP API endpoint. In some examples, the platform processor is implemented as a Representational State Transfer (REST) endpoint. Advantageously, the API may be implemented as a REST endpoint, thereby also allowing the client to communicate using standard Internet or web-based protocols, such as HTTP or HTTPS. Advantageously, by implementing a platform that is provided as an API for one or more clients, allows one or more processor associated with a client to sign-up, or use a web service provided by the platform processor to write or access data into a blockchain. The one or more processors associated with the platform can implement one or more of the services being offered, using a standards-based interface design, such as, but not limited to REST—which is an architectural style for developing web services and web-based interactions. Advantageously, a client can thus communicate with the platform service via HTTP or similar Internet commands. More advantageously, no BSV, Bitcoin, blockchain knowledge, ECDSA, or other cryptographic key-management libraries, or transaction construction software, such as digital wallet software etc., needs to be implemented by the client for any of the services offered. The client using one or more processing resources or user terminals can simply register to use the platform via some known authentication techniques, such as password protection authorisation or standard public key infrastructure (PKI) for verifying client identify. The client should then simply be able to communicate with the platform service via basic HTTP or similar.

Some examples of the services associated with the blockchain that can be provided via the platform are:
- data services, for writing/submitting data into the blockchain to alter a state of the blockchain;
- data services, for reading/obtaining data reflecting the current state of the blockchain;
- services associated with simplified payment verification, for transactions associated with the blockchain;
- services associated with the management of one or more event streams and/or machine-readable contracts associated with the blockchain;
- services associated with the management of a digital wallet framework, for a plurality of clients.

In cases where there may be multiple processors or webservers associated with the platform processor an application programming interface (API) converter may be provided for receiving the request from the client in the HTTP transmission protocol format, converting a received request to a Remote Procedure Call (RPC) format, and sending the RPC request to a given processor among the plurality of processors, that is configured to implement the service identified in the received request. In a reverse flow path, a response may be received that is associated from the given processor in an RPC format, and converted to be sent to the client using the HTTP, or a similar transmission protocol. This is advantageous as it allows the client to communicate requests that are associated with the blockchain via simple HTTP, using a web-based platform API, and seamlessly providing interoperability with any of the nodes or servers that implement the above described services, but that do not communicate using Internet protocol communication standards for web services. The API convertor implemented is not limited to HTTPS to RPC and vice versa conversion, or for that matter other web-based protocols to alternative communication protocols that are supported by the platform processors implementing one or more of the above services, networks for a given cryptocurrency, or digital assets that can otherwise be envisaged. The reverse flow path includes receiving responses associated with the corresponding blockchain transaction from a respective processor in an RPC format, and accordingly, converting the respective responses using HTTP for sending on to the client. Thus, advantageously implementing the proposed interface by the platform processor enables seamless communication, for submitting transactions to the blockchain when the clients and miners use different wireless data communication protocols and mechanisms.

In some examples, the HTTP API may be associated with a handle or alias associated with the platform processor. Such a solution is proposed in U.S. patent application Ser. No. 16/384,696 and UK patent application number 1907180.2, both in the name of nChain Holdings Limited. These applications set out an alias-based payment service and associated protocols, referred to as bsvalias payment service, where an alias is used for addressing instead of the public address of an entity. In this case, the alias will be specific to the platform processor and provided by an alias-based addressing service such as bsvalias, with a machine readable resource that is accessible from a defined or well-known location that provides details on one or more capabilities pertaining to the platform processor. The alias may also be associated with an asymmetric cryptographic key pair for authentication.

In a first aspect, the present disclosure provides a computer-implemented method for enabling the execution of one or more smart contracts associated with a blockchain, the method being implemented by a platform processor associated with an application programming interface (API), to enable clients to access a service for executing a smart contract. This relates to the execute or computer services of the platform as explained above, as it is concerned with facilitating an execution or operation associated with the blockchain for the client. The API may be based on the HTTP API or based on an alias based addressing endpoint as explained above for the platform processor.

The method of the first aspect comprises the steps of receiving a request from a client, the request relating to a smart contract SC. It is known that a smart contract or a machine readable contract is a computer protocol or software that is intended to digitally facilitate, verify, or enforce the negotiation or performance of a contract or agreement between two or more entities. The client may be one among a plurality of clients associated with the platform service explained above. In some embodiments, the request from the client is based on a Hypertext Transfer Protocol (HTTP) transmission protocol format. The smart contract that is to be executed is identified from the request. For instance, this may be based on an identifier or keyword in the request. The method includes accessing the smart contract SC software pertaining to the request. The smart contract may be accessed from a storage module such as a contract store that is provided within the platform or may be remotely located or hosted on a server that can be accessed by the platform processor.

The method then includes identifying an event stream (ES) associated with the blockchain, the event stream ES being specific to the smart contract SC, and representing the states of the smart contract SC. An example mechanism for implementing an event stream in a blockchain is set out in UK patent application number 2002285.1 filed on 19 Feb. 2020 by nChain Holdings Limited. An event stream provides a log of the exact sequence of events executed in order and is implemented on the blockchain. The event stream ES that pertains to the smart contract SC in the request may be obtained directly from the blockchain, or this may be obtained from an off-chain log or database that replicates the event stream on the blockchain. For example, the platform processor may be associated with a snapshot instance database that is configured to provide or indicate the present state of smart contract SC, as recorded in the respective event stream ES in the blockchain at any given time. There will only be one event stream per smart contract that is associated with a given client among a plurality of clients. In some embodiments, each client among a plurality may be associated with an account or identifier which may be used to identify a particular smart contract SC that is associated with the respective client.

In some embodiments, the event stream is implemented on the blockchain as a Finite State Machine (FSM), such as a Deterministic Finite Automaton (DFA), which is a well-known computing term, representing a system having a finite number of states, and which may be in only one state at a given time, with a transition function or a trigger event for transitioning from one stage to the next. In some embodiments such event stream is useful to represent a control means or technique for a technical process. The event stream ES represents the machine-readable contract or smart contract on the blockchain, where, advantageously, an immutable record of the past and current state of the smart contract SC is written into the blockchain. In some embodiments, the request received from the client includes a trigger event, to enable a state transition to take place in the event stream $ES_n$ such as to alter the state of smart contract SC.

The method of the first aspect comprises the step of determining a current state $ES_n$ of the smart contract SC. This is determined based on the event stream ES that pertains to it. The current state of SC is indicated as $ES_n$, wherein n is an integer from 0 to N, each integer n representing a current state or current number of events associated with the smart contract SC, and N represents a maximum or final value or state of n. In some embodiments, the determination of the current state may be based on an indication or record of the present state based on a most recent result associated with the event stream ES. As mentioned above said result represents the state of the smart contract SC, and this may be stored on the blockchain or in one or more separate off-chain storage resources for event stream $ES_n$ such as an event log for data relating to the event stream ES that is specific to the smart contract SC.

In some embodiments, the event stream ES for the respective smart contract SC may be identified based on an identifier of an earlier or pervious blockchain transaction associated with the event stream ES. In some embodiments, If there is no event stream identified for the smart contract SC in the request, or if there is no previous state identified for the event stream ES that is associated with the smart contract SC, then this is a determination that the current state is a first state, i.e. n=0, and a new event stream is to be created for the client associated with the Smart contract. In some embodiments, the current state may also be retrieved or read from the event stream ES directly from the blockchain. This may be performed by a data reader such as mentioned above, which may be a service among the plurality of services provided by the platform processor.

The method of the present disclosure then includes invoking execution of the smart contract SC based on the received request. In some embodiments, once the event stream ES for the smart contract SC is either identified or created, the execution of the software code or logic of the smart contract SC is automatically triggered. In some embodiments, the execution according to the client request may be performed by one or more processors associated with the platform. In other embodiments, the execution of the smart contract code or logic may be based on a serverless execution technique, wherein the platform processor is configured to identify an available server from among a plurality or a pool of servers available for use. In this case, any APIs and/or drivers and/or executable code etc. required will be provided to the available server for executing one or more software routines or programming instructions associated with the smart contract SC.

The method includes the step of invoking the processing or the updating of the event stream ES pertaining to the smart contract SC so that the event stream reflects the state of the smart contract SC based on the received request. This includes processing a new event $E_n$ for the event stream. The new event $E_n$ is based on the received request from the client for the smart contract SC. This may be event data associated with the request for the smart contract. This same event in some embodiments is what is used for the execution of the smart contract SC mentioned above, as the event stream pertains to it and tracks the smart contract's SC stages. In some embodiments, the above steps of invoking the smart contract SC and the event stream takes place in tandem or simultaneously based on the event data, as soon as each of the respective items are identified. In some embodiments, the event stream ES is processed as soon as the smart contract SC logic is executed. In some embodiments, the new event $E_n$ based on the request may identified for the event stream by the execution of the smart contract. Thus, by this the smart contract software itself may be considered an input for the event stream $ES_n$ and is notarised or saved to the event stream before any data is processed. This may be the case for initialising a new smart contract SC for the client.

In some embodiments, the step of invoking processing or updating of the event stream ES pertaining to the smart contract is carried out by the platform processor. In other embodiments, the step of invoking processing or updating of the event stream ES further includes the step of accessing a data writer or data service associated with the platform processor as set out above for processing the new event $E_n$ by writing data into the event stream ES associated with the blockchain.

The method then includes obtaining an updated current state of the smart contract $ES_{n+1}$ based on the new event $E_n$ now processed for the event stream ES associated with the blockchain. The method then includes storing or providing a result based on the updated current state where $ES_n = ES_{n+1}$ for the smart contract SC. In some embodiments, the results may be directly provided to the client in a HTTP transmission format.

Advantageously, the first aspect enables establishing and/or maintaining/updating a tamper-proof record or log, or a certificate confirming the sequential occurrence of events associated with an event stream, where the events are based on received client inputs for a given smart contract, for the execution of the smart contract. Thus, the present disclosure proposes methods, devices, and systems for enabling processing, i.e. creating, updating and/or terminating event stream $ES_n$ that is implemented using the blockchain and automatically creates a tamper-proof log or record of events associated with the smart contract SC that is pertaining to the event stream ES.

In some embodiments, the result may be stored in the snapshot instance database for the smart contract mentioned above or in a separate off-chain log for the event stream ES that tracks the execution of the smart contract SC, where each stored event stream is specific to a given smart contract. Advantageously, the provision of the result as a snapshot in either an event log or an instance snapshot database that is off-chain enables the state of the smart contract SC to be able to be easily and independently verified by any other entity, such as the client or any interested third party (subject to access being provided or allowed), without having to obtain the transaction(s) associated with the event stream in the blockchain.

In some embodiments of the first aspect, responsive to receiving the request from the client, the method comprises providing one or more software libraries and/or verification tools for processing data associated with the smart contract SC to the client. This may be provided in the form of a software development kit. Advantageously, the software libraries provide the client with the functionality to replay an event stream to be able to independently obtain a state or snapshot of the smart contract based on a given event. The verification tools provided to the client advantageously enable the client to compare the recovered or replayed snapshot of the smart contract with the result that is obtained, i.e. based on the event stream ES stored on the blockchain for the smart contract SC. In some embodiments, the verification tools also enable verification of the replayed or recovered event stream with a current snapshot of the smart contract that may be stored on an off-chain storage log or instance snapshot database to verify if they match. In some embodiments, the verification tools may also enable the client to perform the comparison with the data associated with the event stream ES in the blockchain, for instance if an audit is required. If the recreated or recovered event stream matches with the obtained result, then it can be established that the result obtained is consistent with what is recorded in the blockchain, and it has not been subject to tamper by a malign party when or by the time it reaches the client. If the recreated event stream does not match the result obtained or a result snapshot that is stored in an off-chain storage reflecting the event stream ES of the smart contract SC, then this may be an indication that the result may not be a true reflection of the state of the smart contract. In some embodiments, there may be an error notification or message that is generated for the client following such comparison associated with the verification tools, should a comparison using the recovered event stream not result in a match. This discrepancy may in some cases also be notified to the platform processor.

The steps associated with processing a new event $E_n$ based on some event data in the client request received at the platform processor will now be explained.

In some embodiments of the first aspect, if it is determined that n=0, then the new event $E_n$ is identified as the first event to create the respective event stream ES pertaining to the smart contract SC. In this case, the new event $E_n$ is processed by the following steps which may be implemented by the platform processor or a specific executor platform for the compute services module, or by a data writer module, which may also be one or the services associated with the platform. A first blockchain transaction $TX_0$ is created for the Smart contract SC including a first unspent output that is a dust output. Blockchain transaction dust or simply "dust" in the context of blockchain transaction for the present disclosure is understood to be a spendable transaction for a digital asset or cryptocurrency that has an output of low or minuscule value, i.e. the value may be much less that fees for mining the output in the blockchain. This dust output may be a minimum value of cryptocurrency or digital asset output that can be spent. In some embodiments, the digital asset or crypto current funds associated with such dust transactions, i.e. those handling the transfer of minimum value of a digital asset in its output, may be provided or managed by the platform processor. In other words, the dust output referred in the present disclosure for the blockchain transaction is associated with a digital asset having a value that is below a value limit for a transaction, i.e. perhaps the value of the dust output is lower than for instance the mining fee that may be required to spend such transaction.

If it is determined that $0<n<N$, where N is the final or maximum value for n, then $E_n$ is identified as an event to amend an existing event stream ES that is associated with the smart contract SC. In this case, the new event $E_n$ is processed by the following steps which may be implemented by the platform processor or a specific executor platform for the compute services module, or by a data writer module, which may also be one or the services associated with the platform. A current blockchain transaction $TX_n$ is created including a first input spending a dust output, associated with a previous transaction for the same event stream; a first unspent transaction output being a dust output for the current transaction, and a final unspent transaction output being associated with event data, representing the current event $E_n$. In some embodiments, the event data is included in a data carrier element. This may be an un-spendable OP-RETURN output of the transaction. In some embodiments, the event data for the event $E_n$ in the final unspent transaction output for the current blockchain transaction includes a hash of the event data. This advantageously keeps the event data contents of the event stream ES private. In some embodiments, the hash of said event data is applied by the platform processor, thereby advantageously allowing the platform service or processors to hold such event data privately. In other embodiments, the hash of said event data is applied by the client device prior to being included in the request that is received by the platform processor. This advantageously enables the client to hold the event or data associated with the event in the request privately, not even sharing it with the platform. In other embodiments, the event data for the event $E_n$ in the final unspent transaction output includes raw event data, which is public on the blockchain, once written or submitted to it.

If it is determined that $n=N$, then $E_n$ is identified as a final event to terminate the event stream ES that is associated with the smart contract SC. In this case, the new event $E_n$ is processed by the following steps which may be implemented by the platform processor or a specific executor platform for the compute services module, or by a data writer module, which may also be one or the services associated with the platform. A final blockchain transaction $TX_N$ is created including a first input, spending a dust output associated with a previous transaction for the event stream; a first unspent transaction output associated with a digital asset that is above a defined dust output limit, i.e. above the defined or minimum value of digital asset or cryptocurrency. Advantageously, the absence of a dust output signifies the termination of the event stream in this case, as this represents that there is nothing more in the event stream to track, i.e. no more events in the sequence. The provision that the first output being above the dust limit is to signal the end of the chain. Further, the final blockchain transaction does not have any event data output, i.e. there is no data carrier element present, which advantageously signals that this is not a data event to alter the event stream, but to terminate it.

In either of the three cases for n for the event stream ES discussed above, the transaction is submitted to the blockchain and a result associated with the transaction is provided based on the HTTP transmission protocol format. In some embodiments, the event associated with the request, i.e. either $E_0$, $E_n$ or $E_N$, may be a single event or two or more events, relating to the respective request. For example, the request may include a data set of two or more sub-events for each $E_0$, $E_n$ or $E_N$. In some embodiments, the result is based on the event data output of the transaction or the event associated with the respective transaction. In some embodiments, any result or event data that is returned may be held in an un-spendable OP_RETURN output of the transaction. This is a Script opcode which can be used to write arbitrary data on blockchain and also to mark a transaction output as invalid. As another example, OP_RETURN is an opcode of the Script language for creating an unspendable output of a transaction that can store data such as metadata within the transaction, and thereby record the metadata immutably on the blockchain. The metadata could comprise a log or entry or a document which is desired to be stored in the blockchain. The event data or result may in some embodiments be considered to be a payload comprised in the unspendable output of the respective transaction. Such an output may be made unspendable by means of an opcode that terminates the locking script of that output, e.g. OP_RETURN mentioned above. However in other embodiments, the payload or event data may be included in other ways. As mentioned above, the result pertains to a snapshot of the current state of the smart contract SC. This result being stored in and/or accessible from an instance state database or another off-chain event log for the smart contract associated with the platform processor.

In some embodiments, the result associated with the event stream ES includes a certificate confirming at least one of the following:
  a transaction identifier within which the event $E_n$ was submitted to the blockchain
  a Merkle inclusion, proof of the transaction to a header in the blockchain
  a copy of the block header in which said transaction was included The use of dust outputs in the transaction is advantageous and key for maintaining an immutable sequential record of all transactions as they occur for an event stream ES pertaining to the smart contract that is being executed. This is because, although by posting transactions to the blockchain all blockchain transactions would be time-stamped and remain in order in the blockchain, this does not guarantee preservation of their sequential order. This is because transactions might be mined into blocks at different times. Therefore, only the ordering of the blocks in the chain follows chronologically in a blockchain, and not individual transactions. Whereas, to track, record, and audit the exact sequential order of events for an event stream that may be a smart contract, advantageously, the use of dust outputs that must be spent by the first input of the next transaction in the sequence ensures that the order of the transaction is chronologically tracked and a tamper-proof record is created. This is because once mined into a block, the payment of dust from a previous transaction to a next one in the sequence ensures that, in alignment with Bitcoin protocol rules, the sequence of embedded data carrier elements (which are the final outputs in each transaction) cannot be reordered, and no insertions or deletions may occur, which could change it without it being immediately obvious that the event stream has been compromised. In some embodiments, a double spend prevention inherent to the Bitcoin protocol ensures that the movement of cryptocurrency (e.g. dust) between different addresses, and therefore associated events, remains in chronological order. Thus, this improves the security of smart contracts on the blockchain as well as the log, a copy or a replication of the series of event occurrences using the event stream respective to the smart contract. The funds associated with a dust output may be provided or managed by the platform processor as mentioned above. In some embodiments, the platform processor provided the mining fees, for instance from an operational float, to ensure the dust output creates a Tx that is actually mined In some embodiments, a hierarchical deterministic key chain K, to be used for a request associated with the event stream $ES_n$ is determined. Such key chain is unique to the given event stream. The cryptographic private/public key pairs, from the seed or parent, or master key pair K, may then be derived for each event associated, such that $K=K_{n=0}$ to $N$, where n is an integer from 0 to N, each integer n representing a current state or current number of events associated with the smart contract SC, where N represents a maximum or final value of n. This advantageously ensures that the keys derived for a particular event stream are related to a common master or seed key and can be derived for processing each respective event. This way, advantageously, a locking script associated with the dust outputs are secured with a derived key $K_n$ for the current event, and the first inputs each spend the dust outputs from the previous transactions, using the previous key pair $K_{n-1}$. This ensures that the outputs can only be spent with a corresponding key pair, specific to the respective previous transactions.

In some embodiments, each of the transactions created, as discussed above for the third aspect, may further comprise other inputs associated with a digital asset. This may be provided based on an operational float, manged by the platform processor. In some embodiments, this may be associated with a digital asset or cryptocurrency resource or fund maintained or controlled by the payment processor to cover transacting mining fees and one or more other operations for the blockchain etc. The transactions may also have one or more change outputs associated with the digital asset. As mentioned above, the final transaction has all change outputs.

In some embodiments, the event stream ES may be identified based on a transaction identifier associated with the submitted blockchain transaction. In some embodiments, a state associated with the event stream ES may also be identified based on a transaction identifier associated with the most recently submitted blockchain transaction.

In some embodiments, the method includes storing a copy of a record, or a log that is based on the result(s) for each event of the event stream ES, in an off-chain storage resource. This storage resource may be associated with the platform processor, or in a different device, database, or service from which it may be requested or retrieved when requested by a client. Advantageously, storage of the log associated with the results of the event stream are stored separately, to avoid a requirement to download an entire blockchain and sift through the data for any queries associated with the event stream. The blockchain itself implementing the event stream, could be checked in circumstances during audits or data verification. The back-up or separate copy could then be used for quick queries and independent verification of event streams, as explained above.

In some embodiments of the third aspect, a computer-implemented method for accessing a smart contract is provided, implemented by one or more processors of a given client among the plurality of clients, comprising the steps of obtaining or identifying an application programming interface (API) endpoint, associated with one or more processors which are associated with the platform, and requesting for a service associated with the execution of a smart contract SC. The method also includes sending a request for one or more events $E_n$, pertaining to the smart contract SC. As mentioned above, a request is sent using a Hypertext Transfer Protocol (HTTP) transmission protocol format.

The method then includes obtaining one or more software libraries and/or verification tools for processing data associated with the smart contract SC. The method also includes receiving a result associated with an output script of a blockchain transaction, pertaining to the requested event $E_n$, said result being received based on the HTTP transmission protocol format. In some embodiments, the result includes an indication of an updated state of the smart contract SC. In some embodiments, the method further includes the step of recovering a snapshot or a state associated with the smart contract SC using the one or more software libraries, such recovery may be based on or performed using the received result associated with the event $E_n$ for the event stream ES, i.e. similar to replaying the event stream associated with the event $E_n$. Then, using the one or more verification tools, the method includes comparing the recovered snapshot to a result obtained from the event stream ES to independently verify the state of the smart contract. As mentioned above, if there is any discrepancy following the comparison/verification i.e. no match based on the replayed or recovered event stream and another off-chain result or obtained result, an error message or notification may be sent to the client and/or the platform processor.

In some embodiments, the method includes applying a hash function to the event data associated with the event $E_n$ being requested, such that the request includes the hashed event data for the event $E_n$, instead of the raw data.

Aspects of the present disclosure also include a computing device comprising a processor and memory, the memory including executable instructions that, as a result of execution by the processor, causes the device to perform the computer-implemented method, as discussed above, where the computing device pertains to the platform processor.

Aspects of the present disclosure also include a computing device comprising a processor and memory, the memory including executable instructions that, as a result of execution by the processor, causes the device to perform the computer-implemented method, as discussed above, where the computing device pertains to client.

Aspects of the present disclosure also include a computer system comprising at least one platform processor communicatively coupled to at least one client via a wireless communication network, the at least one platform processor associated with an application programming interface (API) endpoint for processing HTTP requests from the at least one client, the at least one platform processor implemented in accordance with the computing device mentioned above; and the at least one client being implemented in accordance with the client computing device mentioned above. The least one platform processor is communicatively coupled via the wireless communication network to one of more of the following components of a platform service: a smart contract store; an event stream log; an instance state database; and a data writer.

Aspects of the present disclosure also include a computer-readable storage medium having stored thereon executable instructions that, as a result of being executed by a processor of a computer, cause the computer to perform the method of any of the aspects and embodiments set out above.

Some specific embodiments are now described by way of illustration with reference to the accompanying drawings, in which like reference numerals refer to like features.

An Overview of a Platform Service for Providing a Plurality of Services Associated with a Blockchain The platform processor mentioned above for providing a plurality of services may be Platform as a Service (PaaS) and/or Software as a service (SaaS) offering that advantageously enables rapid delivery of useful real world business and technical applications, such as management of software controlled technical systems or smart contracts, using a blockchain network such as the BSV blockchain. An overview of the platform services can be seen in FIG. 1 that shows a high level schematic of the system. The platform services has a platform processor 100 that provides an API 108, via which the services may be accessed by one or more clients.

Platform Services 100 as shown in this Figure are made up of three families of services and is aimed at allowing users and organisations to easily and securely make use of the advantages offered by the unique properties of a blockchain, without actually implementing any blockchain based software, knowledge or libraries at the client end. These services are:

Data Services 102 that aim to simplify the usage of the chain as a commodity data ledger.

Compute Services 104 that aim to provide a generalised compute framework backed by a digital asset such as Bitcoin SV.

Figure 1A:
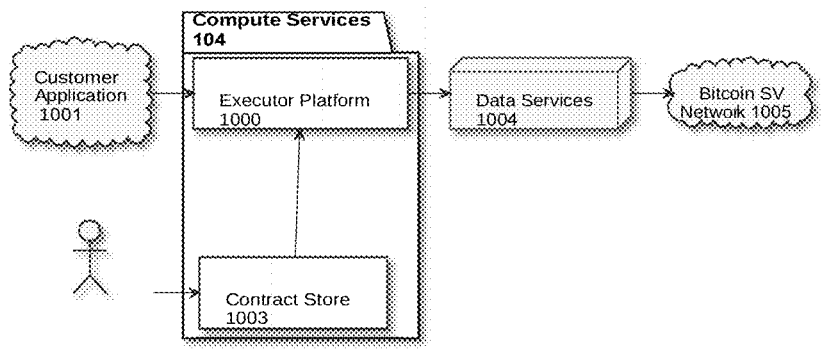
FIG. 1a is a schematic diagram, illustrating components of a compute service of the platform of a plurality of services seen in FIG. 1, according to a first aspect.
Figure 1B:
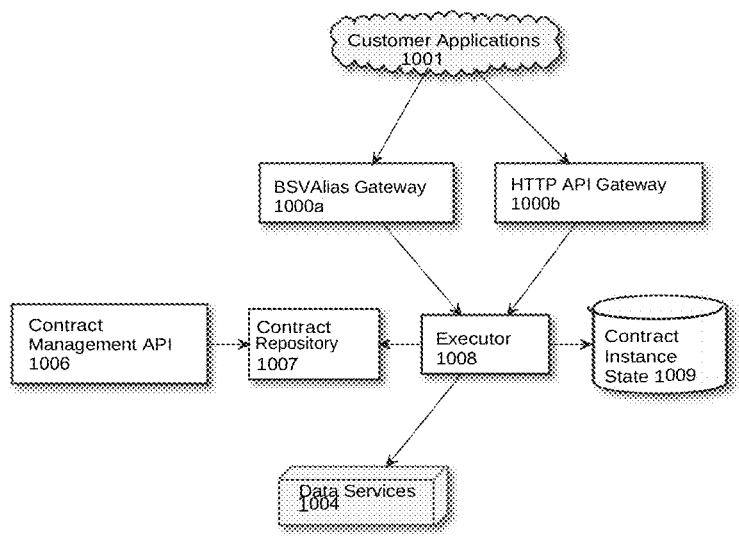
FIG. 1b is a schematic diagram, depicting components of an executor platform or processor of the compute service seen in FIG. 1a, according to a first aspect.

Commerce Services 106 that provide enterprise-class capabilities for transacting using a digital asset such as Bitcoin SV The aspects and embodiments of the present disclosure are mainly concerned with the compute services 104 explained further with respect to FIGS. 1a and 1b.

As mentioned above, requests may be received via or using the HTTPS protocol from a client at the API, as the API is implemented as a web service. The requested services are then implemented by the one or more service modules or processing resources 102-106 using underlying software 110, such a blockchain/platform interfacing software 110 being associated with the blockchain, i.e. to implement resources, libraries and/or key-management wallet implementations for creating, processing and submitting transactions associated with the blockchain. Once processed, transactions can be submitted to the blockchain network 105 (instead of the client implementing any such functionality or transaction libraries). At most, the client may or can implement a digital wallet or the like associated with cryptocurrency or some other digital asset, but this is not essential as the platform service 100 may also be able to provide and manage the digital asset for the client.

Advantageously, a request for blockchain based services is sent and received by the client in the HTTP transmission protocol format, and therefore the client can make use of all advantages and services unique to a blockchain, without having to implement any transaction capability or blockchain libraries. This is because the service is offered via a platform API, which may be a HTTP or REST API endpoint. For example, REST API design standards can process HTTP requests and communication using the following HTTP commands shown in the table below over the Internet—and this is all the functionality that is required by the client, i.e. to be able to send and receive messages over the Internet. The platform processor(s) implement the commands remotely, or separately for the client.

| Commands | GET | POST | PUT | DELETE | PATCH |
|---|---|---|---|---|---|
| Resource | read | create | update or create | delete | partial update |

The received request from the client may be an HTTP GET or HTTP POST or HTTP PUT or HTTP PATCH request that includes or is associated with a client identifier, specific to a given client, as well as a service identifier for the given service requested among the plurality of services that are offered by the platform, as mentioned above. In some cases, the result sent to the client is an HTTP POST request based on the client identifier.

In some examples, to make addressing for blockchain based computations and transactions simpler, there already exist mechanisms where a memorable and more user-friendly alias is used instead of the complicated public address for one or more entities. Such a solution is proposed in U.S. patent application Ser. No. 16/384,696 and UK patent application number 1907180.2, both in the name of nChain Holdings Limited. These documents set out an alias-based payment service and associated protocols, referred to as bsvalias payment service, where an alias is used for destination addressing instead of the public address of a client entity or indeed a service entity such as the platform 100. The alias in such a system is usually associated with a domain name of a sending/receiving entity and may be a URI or an email address. Thus, as long as a sender or entity is aware of, or is provided with the alias, this is sufficient for the bsvalias payment system or an alias based addressing mechanism. Messages may be sent to the alias of a client, for instance, using instructions provided in a machine-readable resource, such as a JavaScript Object Notation JSON document, saved in a well-known URI or location for the bsvalias or other payment service. In some embodiments of the present disclosure, one or more of the plurality of clients may have an alias such as the above to identify the respective client. Similarly, the API of the platform 100 may also be associated with such as alias for addressing.

It may also be possible to validate the client based on the client identifier and a record corresponding to the client identifier, the record associated with the platform processor. For example, such record may have been created and stored in or associated with the platform processor at the time of client sign-up or registration. Then, based on a successful validation of the client, the method includes determining if the received request from the client is valid, based on the service identifier and an attribute or setting included in the respective record. In some cases, said attribute or setting may indicate whether or not a given client is allowed access to all or part of the requested service. For instance, one or more levels of permission associated with the client identifier may be provided in the attribute or setting. For example, a given client may be allowed to request services to read data that is on a blockchain for a specific event, but may not be allowed to modify, delete or terminate such event, whereas another client may have permission for all action pertaining to one or more services.

In some examples, the step of verifying the identity of a given client may be based on a digital signature associated with the client. Cryptographic key pairs, including a private key and a public key (or public address) associated with each client, may be used for verifying that a request made for a service did indeed originate from the given client, i.e. where data signed by a private key can only be recovered or validated using the corresponding public key. Standard public key infrastructure (PKI) techniques may be used and implemented if verification is based on a digital signature.

First Aspect: A Platform Providing Compute Services Associated with a Blockchain for Executing a Smart Contract FIG. 1a shows some of the components of the compute services 104 offered by the platform 100 of FIG. 1 in more detail, along with an illustration of the components interacting with it for executing aspects and embodiments of the present disclosure as set out from FIG. 2 onwards. The components shown in FIG. 1a are explained below.

Data services 1004 includes a data writer which may be an HTTP API to write, i.e. notarise or publicise, data via a Bitcoin SV blockchain 1005. It will be understood that the present disclosure is not limited to the use of such blockchain alone. Client-side tools associated with the data services 1004 may be provided in the customer application 1001 in FIG. 1a. This may be in the form of a software application provided in the client entity/device. The customer application 1001 may be used to verify the certified data, allowing any party to verify that the data has not been tampered with since inclusion in the blockchain. These tools may be supplied via Platform Services 100 or may be independently implemented based on documented specifications.

Compute Services 104 (from FIG. 1) is shown to include the Executor Platform 1000. The executor platform 1000 is in some embodiments referred to as the platform processor in the present disclosure for implementing compute services. A Contract Store 1003 is also provided. This may include a web gallery to allow customers to browse from a catalogue of pre-build smart contract software. The Executor platform 1000 provides customers with a Platform-as-a-Service capability for the deployment and execution of smart contracts. The Contract Store is a collection of pre-built and platform-configured Smart Contracts. Where multiple customers express the same (or very similar) smart contract needs, Platform Services 100 can offer implementations of such contracts for immediate, zero-development deployment. The contract store 1003 will allow customer administrators access to a selection of such turn-key contracts, together with both web and API configuration and parametrisation functions.

For compute services 104, the client or customer application 1001 also includes a Software Development Kit (SDK) with documentation, libraries, examples and local runtime for smart contracts, to allows for customer developers to build and test their contracts locally before deploying or invoking a smart contract platform. Verification Tools are also included, which may be off-platform tooling for verifying the correctness of the execution of a smart contract instance, given both the smart contract code and the underlying event stream data.

The executor platform 1000 may comprise the following components seen in FIG. 1b, which interacts with the client application 1001 and the data services 1004 seen in FIG. 1a. In some embodiments, the method set out in FIGS. 2 to 5 below as well as the example scenario depicted in FIG. 8 may be executed or performed by the executor platform 1000.

Event Gateways 1000a and 1000b: These gateways may be JSON-over-HTTP or bsvalias endpoints for feeding events, such as input data received form a client, into a contract. In some embodiments, they provide a bridge from external inputs, and existing or built-in solutions for authentication and authorisation. The event gateways 1000a and 1000b may be configured to implement the functionality of the HTTP APIs to provide an endpoint that can be accessed or provided to other entities, such as a client entity. The event gateway(s) may be implemented a gateway service for the executor platform 1000.

Contract Management API 1006 shown in FIG. 1b allows customers or clients to upload smart contract programs and configure their execution environment. This component may be associated with or provided by or via the gateways mentioned above that are active (including authentication and authorisation), the event stream properties (notarise or publicise), and a method to upgrade the smart contract software that may be stored in a contract store 1003 discussed in FIG. 1a, and/or may be associated with a contract repository 1007 discussed below. In some embodiments, this component may be responsible for providing any libraries or software tools and functionalities to be sent to a client entity in order to process data associated with the smart contract or the event stream associated with it.

Contract Repository 1007: This component may be configured to provide storage and management APIs for smart contract implementations. This component may be configured to store contract executables, in order for the executor platform 100 to locate and recover the appropriate handle or smart contract identifier for a given input received form a client, in order to execute the smart contract code. In some embodiments, this may be implemented as or within the contract store 1003 itself, or may be implemented separated to invoke the software for the smart contracts stored in the contract store 1003.

Executor 1008: This is a processing or computing component of the platform processor for compute services 104 of the platform 100 in FIG. 1 and the executor platform 1000 in FIG. 1a. The executor 1008 is configured to provide a serverless execution platform for smart contracts upon receipt of the client input via the gateways 1000a and/or 1000b. Thus, the executor 1008 may be configured to react to events received through gateways by invoking the appropriate contract identified by the client. The executor is further configured to invoke processing associated with an event stream associated with the contract in the blockchain.

For instance, this may include managing smart contract state persistence and/or connecting to downstream event stream APIs. The executor is further configured to recover the smart contract from the repository and/or retrieve instance state from the state database in order to determine a present state of a smart contract. The executor may further be configured to record an input event to an event stream, and execute the smart contract such that it processes the input event data, which is notarised in the event stream on the blockchain. The executor further provides an updated snapshot state of the smart contract to be persisted back to an instance state database (see below) for off-chain storage of the state of the smart contract.

Instance State Database 1009: This component is a storage checkpoint or database that reflects the state of a contract after completing the processing of an event from a client. This component may be configured to store the snapshot state of a contract (the state derived from applying the contract rules to all inputs) following processing by the executor 1008 between invocations of the a given smart contract program.

Smart Contracts Implementation—Overview

As is known, a contract is a legally binding agreement that recognises and governs the rights and duties of the parties to the agreement. An agreement typically involves the exchange of goods, services, money, or promises of any of those. A smart contract is a computer protocol intended to digitally facilitate, verify, or enforce the negotiation or performance of a contract. For example, Ethereum is a popular platform capable of running what may be considered smart contracts. The Bitcoin script itself may be considered a smart contract, as it is software that enforces a set of rules between transacting entities, arguably making bitcoin a smart contract platform. R3's Corda may be considered a smart contract platform, along with various other blockchain-like platforms.

Smart contracts can be broadly categorised as follows:

On-chain Contracts: An on-chain smart contract, such as Bitcoin script, packages the rules of the contract together with the parameters of the contract instance. The execution audit trail is publicised on-chain, and (assuming the underlying blockchain provides such guarantees) is permanent and immutable. Examples of on-chain contracts include atomic swaps, r-puzzles, accumulator trees and payment channels. In all cases, a supporting off-chain infrastructure is still required, but the core of the contract is expressed via Bitcoin script and executed by miners as part of transaction validation.

Off-chain Contracts: An off-chain smart contract exists as traditional computer software. It is operated by an entity acceptable to all contracting parties. Off-chain contracts with no usage of a blockchain are not considered further in this disclosure.

Hybrid Contracts: A hybrid contract represents a blend of on-chain and off-chain approaches. A hybrid smart contract enhances the capabilities of an off-chain contract by leveraging a blockchain. Typically, these additional capabilities include provability of data integrity, and security. Several nascent hybrid smart contract platforms are either in development or launched already. Examples include Tokenized and GearSV.

There are advantages to building a smart contract platform on top of a blockchain, where the underlying blockchain provides certain guarantees that are otherwise difficult or impossible to achieve. For the purposes of this disclosure, the term "blockchain" may be used to describe a public, proof-of-work blockchain, specifically Bitcoin SV. However, it will be understood that the aspects and embodiments of the present disclosure are not to be limited to this.

Smart contracts of any form deliver value through automation. A correctly implemented smart contract will act autonomously and in accordance with the rules programmed into it. There is realisable value through automation as high volumes of contract instances may be processed automatically on ordinary and inexpensive hardware, with a lower error rate than a non-automated alternative processes. By binding a smart contract platform to a blockchain, the intrinsic properties of a blockchain may be inherited by all smart contracts running on that platform. These benefits are primarily derived through the immutable nature of the chain, the absence of a single record-keeping entity, and the underlying security primitives of the blockchain, such as BSV.

Data may be committed to a blockchain-based commodity ledger. In constructing the commitment, both the data and associated metadata is captured. This metadata always includes a timestamp, as the blockchain acts as a form of witness, or timestamp authority. It may additionally include identity information, in the form of a digital signature and associated public key, where that public key may be recognised by existing legal precedence as a proxy for identify. This may include scenarios in which a public key has been certified by some trusted third party or Certification Authority, or where a service provider has applied the signature on behalf of an authenticated client.

Once committed to a blockchain-based commodity ledger, data can be proved to have not changed since that commitment. This may be used to demonstrate that no record tampering has occurred. By not relying on a single record-keeping authority, it is not possible to gain control of any such authority in order to alter records or cast doubt on the provenance of the blockchain as a witness. Implementing smart contracts in association with a blockchain is advantageous at least in view of the combination of cost and error reduction through automation, enhanced audit and accountability through tamper-evident record keeping, and the ability to leverage Bitcoin's underlying security primitives.

A finite-state machine (FSM), is a mathematical model of computation. It is an abstract machine that can be in exactly one of a finite number of states at any given time. The FSM can change from one state to another in response to some inputs; the change from one state to another is called a transition. An FSM is defined by a list of its states, its initial state, and the inputs that trigger each transition. State machine replication assumes that the replicated process is a deterministic finite automaton (DFA) and that atomic broadcast of every event is possible. It is based on distributed consensus and has a lot in common with the transactional replication model. A DFA is a model of software that is categorically in exactly one state at a time. The only way that the FSM can transition between states is in response to an external event. Replication builds on this property, by realising that if the FSM is deterministic and the input stream of events is faithfully replicated between machines, then each machine processing those events will end up in exactly the same state.

Figure 2:
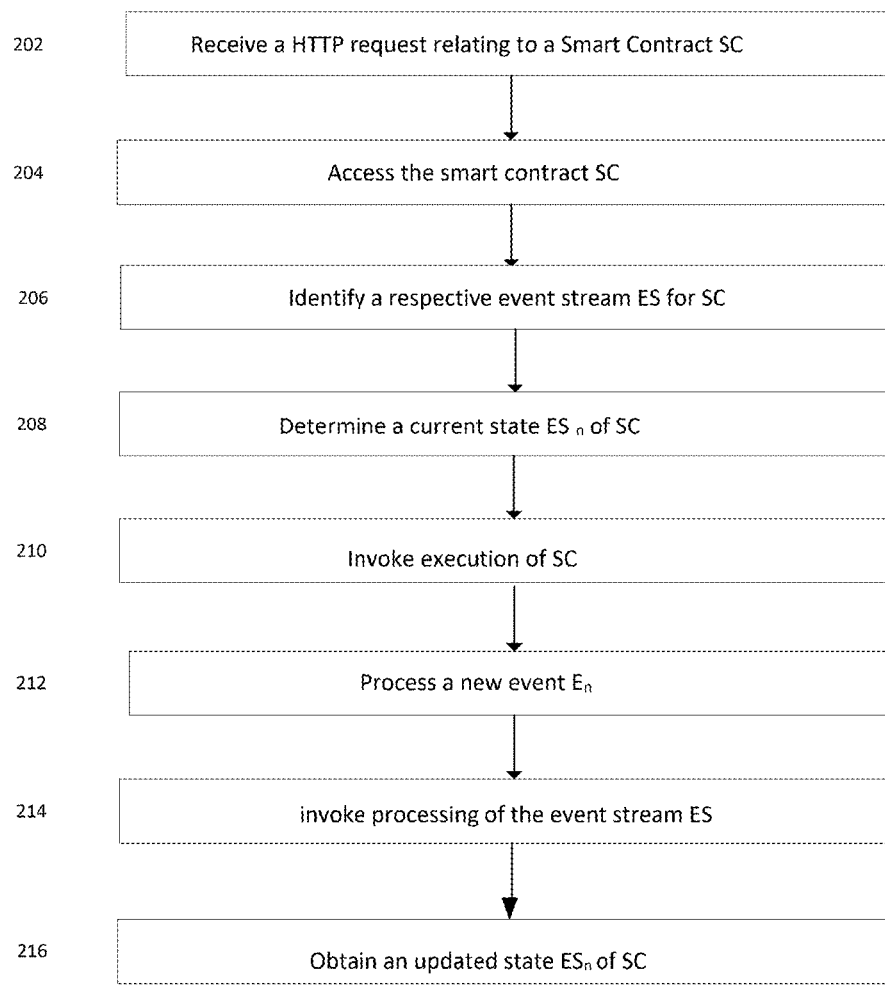
FIG. 2 is a flowchart, depicting a method for enabling the execution of one or more smart contracts as implemented by one or more processors associated with a platform service.

In aspects and embodiments of the present disclosure, a smart contract is implemented as an FSM, and more particularly a DFA, i.e. software model that is in exactly one state at a given time Execution of a Smart Contract According to the Present Disclosure FIG. 2 relates to a method according to first aspect of the present disclosure for enabling execution of a smart contract associated with a blockchain. The method of FIG. 2 is implemented by a platform processor associated with an application programming interface (API) for the service. The platform processor may be the executor platform 1000 seen in Figure 1a or the executor 1008 within the executor platform 1000 for implementing compute services 104 of a platform service 100 as seen in FIG. 1.

Step 202 depicts receiving a request from a client, the request relating to a smart contract (SC). The request is in a Hypertext Transfer Protocol (HTTP) transmission protocol format and is provided via an API or bsvalias gateway, as mentioned above in FIG. 1*b*.

Step 204 depicts accessing the smart contract SC pertaining to the request. The smart contract that is to be executed is first identified from the request. For instance, this may be based on an identifier or keyword in the request. The method includes accessing the smart contract SC software pertaining to the request. The smart contract may be accessed from a storage module such as a contract store 1003 or a repository 1007 seen in FIGS. 1*a* and 1 *b*, respectively that is provided within the executor 1000 platform, or said storage module may be remotely located or hosted from a location that can be accessed by the platform processor.

Step 206 depicts identifying an event stream (ES) that is associated with the blockchain, the event stream ES being specific to the smart contract SC and representing the states of the smart contract SC. The event stream ES that pertains to the smart contract SC in the request may be obtained directly from the blockchain, or this may be obtained from an off-chain log or database that replicates the event stream ES on the blockchain to provide a current snapshot of the contract, such as the instance snapshot database 1009. The event stream ES may be identified based on transaction identifiers pertaining to the smart contract SC identified in the request in step 202.

The event stream ES represents the machine-readable contract or smart contract on the blockchain, and is implemented based on a Finite state machine (FSM) as explained above for tracking the state of a smart contract SC.

Step 208 determines a current state $ES_n$ of the smart contract SC. This is determined based on the event stream ES that pertains to it. The current state of the smart contract SC is indicated as $ES_n$, wherein n is an integer from 0 to N, each integer n representing a current state or current number of events associated with the smart contract SC, and N represents a maximum or final value or state of n. In some embodiments, the determination of the current state may be based on an indication or record of the present state based on a most recent result associated with the event stream that represents the state of the smart contract SC. This may be determined directly from the transactions associated with the event stream ES on the blockchain, or may be determined in one or more separate off-chain storage resources for event stream ES, such as an event log for data relating to the event stream ES specific to the smart contract SC.

Step 210 depicts invoking execution of the smart contract SC based on the received request. In some embodiments, once the event stream ES for the smart contract SC is either identified or created, the execution of the software code of the smart contract SC is automatically triggered. The process of creating or uploading the event stream ES are seen in more detail in FIGS. 3 to 5. In some embodiments, the execution according to the client request may be performed by one or more processors associated with the platform processor. In other embodiment, the execution of the smart contract code may be based on a serverless execution technique.

Serverless computing is a cloud computing execution model in which the cloud provider runs the server, and dynamically manages the allocation of machine resources. Serverless computing can simplify the process of deploying code into production. Scaling, capacity planning and maintenance operations may be hidden from the developer or operator. Popular serverless platforms such as AWS Lambda, Azure Functions, and Cloudflare Workers, provide not just a runtime environment in which the developer or operator does not have to concern themselves with the underlying compute environment (virtual machine, operating system configuration, etc), but also SDKs for producing serverless software ready-to-run on a host infrastructure.

Existing serverless execution providers offer rich configuration around their runtimes, together with off-the-shelf entry points to the executables. Common entry points include endpoints, message queues, and file storage. These entry points, or gateways, fit with the smart contract model of feeding inputs to a logic processor (the software). In adopting this model of entry point gateways and a commodity runtime environment, the platform may record all inputs from all sources into an event stream (via the data services 1004, for example). Gateways with authentication and authorization features further provide input gating or authorisation. Finally, in instantiating a new smart contract instance, capturing an identifier or a hash of the contract software in the event stream before any events are written allows further allows for any replicas of the event stream to be confident that they are running the correct FSM associated with the smart contract.

Step 212 depicts invoking processing or updating of the event stream ES pertaining to the smart contract SC. In some embodiments, the step of invoking processing or updating of the event stream ES pertaining to the smart contract is carried out by the platform processor, i.e. within the executor platform 1001 itself. In other embodiments, the step of invoking processing or updating of the event stream ES further includes the step of accessing a data writer (see data services 1004 in FIG. 1*a*) associated with the platform processor as set out above for processing the new event $E_n$ by writing data into the event stream ES associated with the blockchain.

In some embodiments, the event stream relates to a state machine, and represents a machine readable contract or smart contract that is implemented as a finite state machine in the blockchain, such as a Deterministic finite automaton (DFA). An FSM may be defined by a list of its states, its initial state, and the conditions for each transition. In the Bitcoin SV Blockchain the UTXO set can be thought of as a state machine, with a given outputs spent state being a function of previous inputs to the transaction (the machine). Thus, by replaying all transactions, the current spend state of any output, and the current contents of the UTXO set, can be established deterministically using the blockchain. Thus, in the embodiment of FIG. 2, the request can be considered as a request to alter a current state of a smart contract SC.

Step 214 depicts processing a new event $E_n$ based on the received request. This processing is explained in more detail in FIGS. 3 to 5, depending on whether the request is to invoke or update a new contract or an existing contract, or to terminate an existing contract that is associated with the client.

Step 216 depicts obtaining an updated current state of the smart contract $ES_n$ following or based on the processing of the new event $E_n$. A result indicating or based on the updated state may be stored in an off-chain event log associated with the platform processor. In some embodiments, the result is based on an updated current state $ES_{n+1}$ for the smart contract is sent to the client. This result may be associated with an output script of a corresponding blockchain transaction. In some cases, the result includes functionality that enables a snapshot of the event stream to be recreated or recovered so that the recovered version can be verified against stored or trusted versions of the event stream.

In some embodiments, SDKs with software libraries and the verification tools may also be provided to the client to enable the client to independently process and verify the result. These tools are capable of recovering and replaying the event stream ES. The state of the smart contract SC may then be verified against the current snapshot state held within the platform, for instance in an instance snapshot database. If the snapshot state from the event stream replay matches an off-chain stored state or an obtained result, then it can be verified that operation and execution has been carried out correctly, as per the smart contract logic.

Advantageously in the present disclosure as set out in FIG. 2, with the smart contract modelled as a DFA with replication of all input events in event streams (ES), all parties to a smart contract may be able to verify the operation of the contract software, i.e. that it has accurately executed logic in accordance with a rule set, and that no tampering has taken place, without trusting any of the other parties to the contract, provided certain pre-defined requirements are met.

Non-deterministic contracts, such as those that rely on data sources or events outside of the event stream, may not produce the same state given the same inputs. Common sources of non-determinism include time functions and (pseudo-) random number generators. These sources of non-determinism are easy to work around, such that they become deterministic. Time may be sourced externally and fed as input data to the contract, just like any other input data. In this way it is captured by the event stream ES and may be replicated.

(Pseudo-) random numbers may be constructed using many different techniques. Often these techniques start by initially seeding a random number generator from available entropy, then random numbers from this point on follow a deterministic pattern. More sophisticated techniques prevent a bearer of the replicated log from guessing the next random number generated in the sequence, but still allow for after-the-fact verification of correct operation. Other sources of non-determinism may be handled in a similar manner. If a smart contract requires external data, for example knowledge of the current price of an asset, commodity, instrument, or similar subject, the price may be fed as an input.

Advantageously, in the present disclosure as set out in FIG. 2, all inputs are captured in the event stream and replicated to parties for verifying the correctness of the contract operation. Following on from the deterministic behaviour of the contract, it is apparent that inputs must be replicated, such that any (authorised) party to the contract may independently verify the correctness of operation.

Advantageously, in the present disclosure as set out in FIG. 2, the inputs may be gated or secured. If the contract output is a function of the stream of inputs, then it follows that those inputs must be gated such that only authorised parties, i.e. a valid client with access to the smart contract, may provide inputs. A smart contract that fails to enforce authorisation of actions that produce input events may produce an output state that is valid per the software but invalid by terms of the agreement.

Advantageously, in the present disclosure as set out in FIG. 2, event logs are faithfully transferred to all replicas without any possibility of tamper. If logs are modified, tampered, mutated, omitted, or otherwise malleated between replication targets, then each target may arrive at a different view of the current state of the contract. The use of event streams to track the consecutive execution states of the smart contract prevent any possibility of tamper.

Advantageously, in the present disclosure as set out in FIG. 2, replication targets for the event stream run the same FSM or instance of the smart contract. Otherwise, If the log is replicated correctly, but the software processing entries in the log differs between replication targets, then each target may still arrive at a different view of the current state of the contract. The use of event streams for a current snapshot of the smart contract that can be independently verified prevents incorrect replication.

Some existing blockchain-based smart contract platforms attempt to replicate the smart contract software to a wide variety of nodes in a network. Each node in the network processes every input to every contract. This however limits the scaling potential of the platform to the upper throughput of the weakest node in the network. The use of event streams as explained above in FIG. 2 to track the execution of a smart contract in the blockchain enables off-chain storage of a snapshot of the smart contract, and allows independent verification by allowing a recreation of the event stream by verifying parties, which can then be compared to the stored current snapshot.

Thus, mechanism of the present disclosure as set out in FIG. 2 offers the following capabilities and advantages for the execution of smart contracts:

All inputs are recorded to an event stream.

Off-chain and secure input event storage allows for event streams to notarise all inputs without revealing them on-chain.

The smart contract software itself may be considered an input, and is notarised to the stream before any data is processed.

The contract is run via a serverless execution platform.

The contracts respond to events which are received through gateways (HTTP APIs and BSV alias). The contract execution environment provides (limited) state management, allowing the snapshot state of a contract instance to be persisted between event executions. The executor can recover previous snapshot state and provide this along with the event input, and persist updated snapshot state after execution of the smart contract.

Mechanisms for working with common sources of non-deterministic behaviour (time and random numbers) are provided by the platform processor.

An SDK is available containing for provision to the client side, which may include:

Libraries to build a smart contract against, which govern the receipt and production of entry/exit state snapshots, and input parsing.

Development mode runtimes, for testing contracts on developer equipment

Extensive documentation including quick starts, walkthroughs, API reference material, operator instructions for development runtimes A verification tool capable of recovering an event stream and contract instance from the platform and replaying the event stream to verify a given state of the contract.

Figure 3:
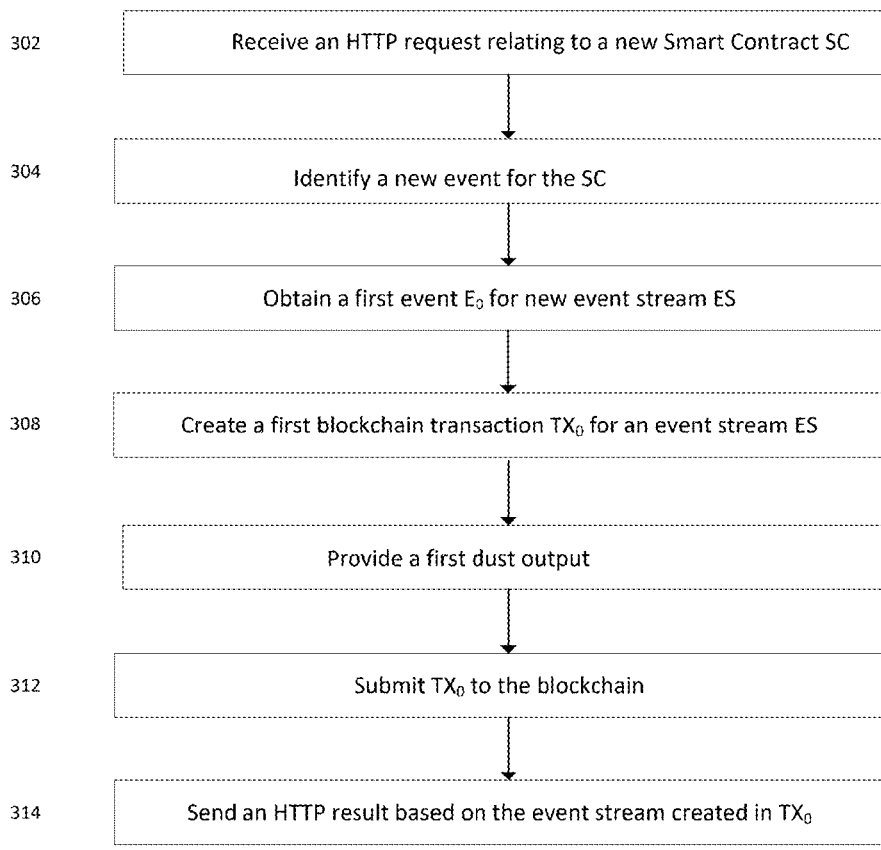
FIG. 3 is a flowchart, depicting a method for creating an event stream for a smart contract, the event stream associated with a blockchain, as implemented by one or more processors associated with a platform service.
Figure 4:
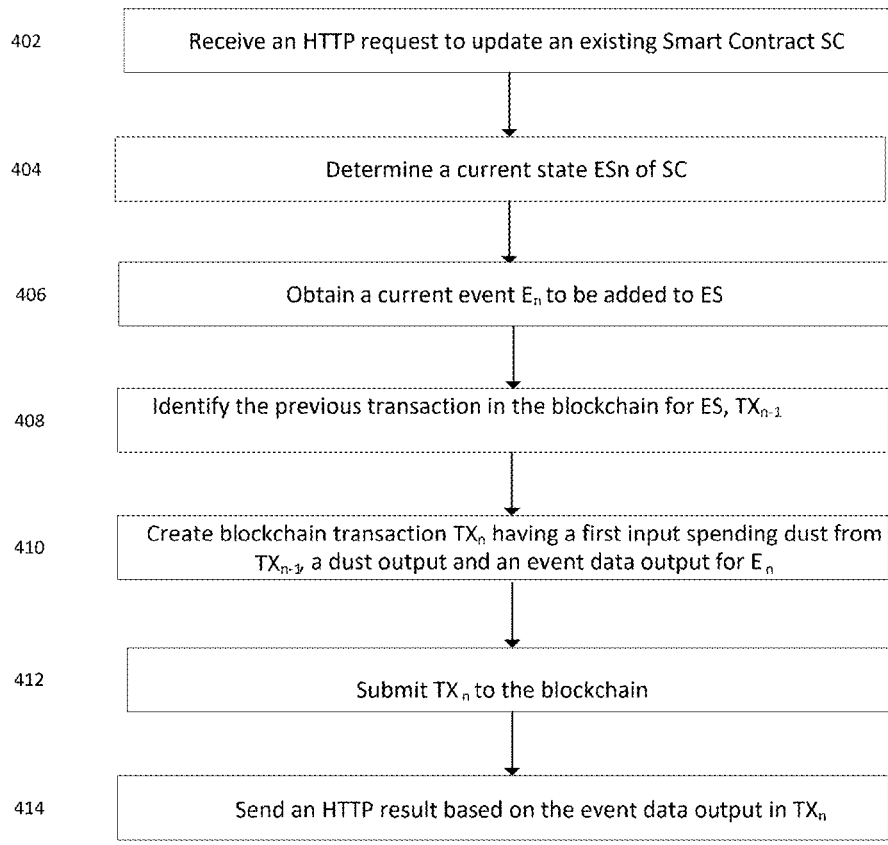
FIG. 4 is a flowchart, depicting a method for updating an event stream for a smart contract, the event stream associated with a blockchain, as implemented by one or more processors associated with a platform service.
Figure 5:
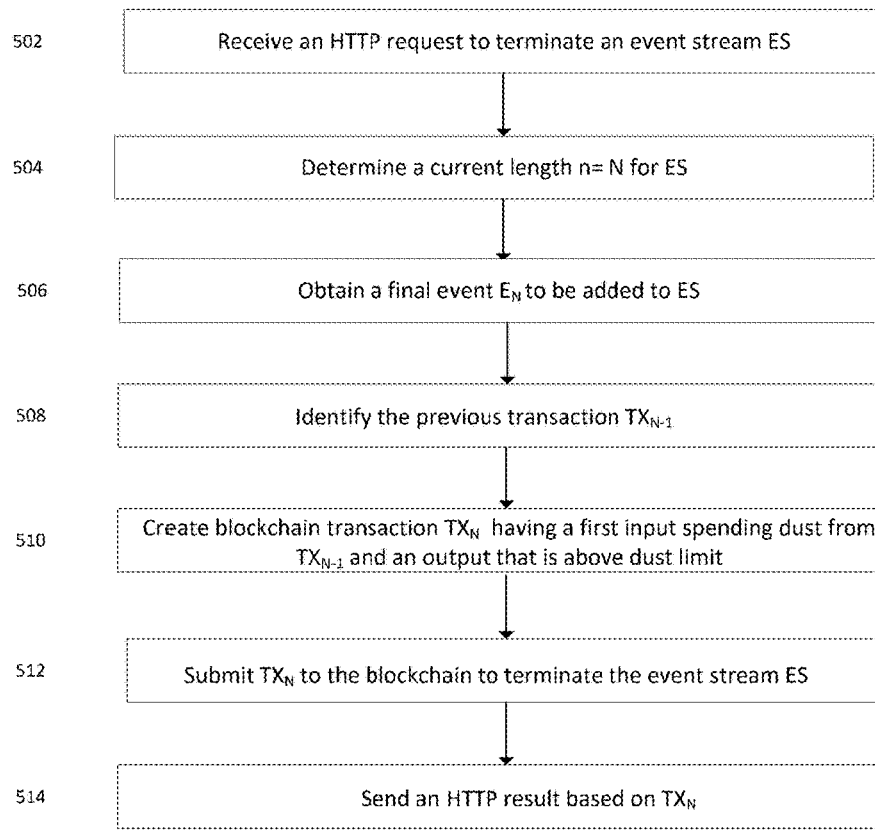
FIG. 5 is a flowchart, depicting a method for terminating an event stream for a smart contract, the event stream associated with a blockchain, as implemented by one or more processors associated with a platform service.

FIGS. 3, 4 and 5 discusses a method for implementing the event stream ES that represents a smart contracts SC as discussed in FIG. 2 for establishing an immutable sequential log or record of the smart contract up to its current state on the blockchain. In some embodiments, the log in addition to being stored on the blockchain, can also be provided or stored off-chain. As event stream ES is based on inputs and outputs associated with transactions, the techniques described set out a method for establishing an immutable chronological log of all transactions associated with an event stream ES that represents the smart contract SC on the blockchain. The event stream ES may represent the smart contract using an FSM, DFA etc.

FIGS. 3 to 5 may be implemented by the platform processor associated with an application programming interface (API). In some embodiments, the steps of FIGS. 3-5 may be carried out by an executor component that is associated with the compute services module 104 seen in FIG. 1 and explained in more details in FIG. 1b. In other embodiments, the steps of FIGS. 3-5 may be carried out by a data writer that is associated with the data services module 102 seen in FIG. 1 and explained in more details in FIG. 1b. In this case, the data writer will be triggered or invoked by the executor of the platform processor.

FIG. 3 relates to creating a new event stream.

Step 302 depicts receiving a request from a client, the request associated with a new smart contract for the given client. FIG. 3 relates to creating a new event stream ES using the blockchain for SC. The request from the client is in a Hypertext Transfer Protocol (HTTP) transmission protocol format, as set out above In Step 304, as the request is for a new smart contract associated with the client, a new event stream ES is to be initialised or created for this smart contract SC. This step relates to identifying a new event in the request that is now to be associated with the smart contract.

Step 306 depicts obtaining data associated with the first event $E_0$ for the new event stream ES to be created in the blockchain for the smart contract SC based on event data in the received request in step 302.

Step 308 depicts creating a first blockchain transaction $TX_0$ for the new event stream ES where n=0. In some embodiments, prior to the creation of the first transaction, this step may also include determining a hierarchical deterministic (HD) key chain K to be used with a new event stream ES to be created. In some embodiments, this may be implemented by a HD wallet implementation associated with the platform processor to generate a hierarchical tree-like structure of keys which start from the seed or parent or master key based on the known BIP 21 Protocol. The HD key creation and transfer protocol greatly simplifies key generation and permits creation of child accounts which can operate independently, gives each parent account the ability to monitor or control its children even if the child account is compromised. The HD protocol uses a single root seed to create a hierarchy of child, grandchild, and other descended keys with separate deterministically-generated integer values. Each child key also gets a deterministically-generated seed from its parent, called a chain code. This way, any compromising of one chain code doesn't necessarily compromise the integer sequence for the whole hierarchy. In addition to the above advantages, in the present aspect, this key generation is carried out by the platform processor, therefore removing the resource and functionality of this generated from the client. No HD wallet therefore needs to be implemented by the client. In step 308, key chain K includes a series of private/public key pairs derived from a selected parent key pair, such that:

$$K=K_{n=0 \text{ to } N},$$

whereby n is an integer from 0 to N, each integer n representing a current length or current number of events associated with event stream ES, and N represents a maximum or final value of n.

In some embodiments, authentication and authorization checks are performed, which may be a test for the presence of an API access token, or a session check or a password/digital signature test, or some other appropriate method to validating the client or the service request made by the client Step 310 depicts that the output of the blockchain transaction $TX_0$ created in step 308 includes at least a first unspent transaction output ($UTXO_{0\_dust}$) being a dust output. In some embodiments, said dust output is associated with a locking script secured with a first derived key pair $K_0$ in the series of keys derived from the HD key chain K in step 308. A dust output is associated with a (digital asset) value that is below a defined limit for a transaction or having a defined minimum value, i.e. lower than a mining fee that would be required to spend such transaction. There may also be other inputs associated with digital assets associated with an operational float or digital asset or cryptocurrency fund that is maintained or associated with the payment processor. It is also possible to have other outputs in the transaction that are digital asset change outputs.

Thus, in some embodiments, a Create template for a blockchain transaction to create an event stream ES as per the present embodiment is one where the first input must not be dust. This is to advantageously indicate that there is no previous entry in the event stream, and this is the first entry. The Create template also specifies that first output of the template is dust, and that there is no data carrier or data output (so no OP_RETURN), as there is no event data associated with the Create state—other than the creation of a new event stream ES.

Step 312 depicts submitting the transaction $TX_0$ to the blockchain. Here, the transaction may be submitted to the blockchain, such as the Bitcoin SV network for inclusion in a subsequent block by a miner node or BSV node software associated with the platform processor. In some embodiments, once mined, the transaction identifier $TX_0$ may be used to uniquely identity the newly created event stream ES or the new smart contract associated with the client.

Step 314 depicts sending a result associated with the created event stream ES in $TX_0$ to the client, the result being provided in the HTTP transmission protocol format. The result relating to the event stream may be copied or saved separately from the blockchain.

FIG. 4 relates to updating the state of a smart contract by append a new event to an existing event stream ES associated with the smart contract on the blockchain.

Step 402 depicts receiving a request from a client, the request being to amend or update an existing smart contract SC identified in the request. The request from the client is in a Hypertext Transfer Protocol (HTTP) transmission protocol format.

In step 404, the current state $ES_n$ n of the smart contract is determined. This is determined based on the event stream ES that is specific to the smart contract SC. The event stream ES is stored or implemented in the blockchain. In some cases, the current state of the smart contract SC may also be determined from a snapshot or log of the event stream ES that is be stored off chain. For instance, this log or snapshot database may be provided within the platform 100 in FIG. 1 or may be stored in a location from which is can be retrieved or accessed by the platform processor.

As discussed in relation to step 308 of FIG. 3, in some embodiments, the event stream ES on the blockchain is associated with a key chain or key seed pair K such that $K=K_{n=0 \text{ to } N}$, where n is an integer from 0 to N, each integer n representing a current length or current number of events associated with the event stream $ES_n$ where N represents a maximum or final value of n. In some embodiments, authentication and authorization checks are performed, which may be a test for the presence of an API access token, or a session check or a password/digital signature test, or some other appropriate method to validating the client or the service request made by the client Step 406 depicts identifying or obtaining data associated with an event $E_n$, this being the event to be currently added or appended to the event stream ES on the blockchain based on event data for the smart contract SC in the received request in step 402.

Step 408 includes identifying a previous blockchain transaction $TX_{n-1}$ associated with the event stream ES of the smart contract SC. Once identified, a key pair $K_{n-1}$ associated with the identified previous transaction $TX_{n-1}$ is then determined. As mentioned above, this may be based on the same seed key pair K set out in step 404.

Step 410 depicts creating a current blockchain transaction $TX_n$ for the event stream ES where 0<n<N. In some embodiments, a key pair $K_n$ for the current event $E_n$ is derived from the seed key pair K. The blockchain transaction $TX_n$ created for the current event $E_n$ to be appended to the event stream ES includes:
- a first input spending a dust output associated with the previous transaction $TX_{n-1}$, said spend authorised with the obtained key pair $K_{n-1}$ for the previous transaction;
- a first unspent transaction output ($UTXO_{n\_dust}$) being a dust output for the current transaction $TX_n$, said dust output associated with a locking script secured with the derived key pair; and
- a final unspent transaction output ($UTXO_{n\_data}$) associated with event data representing the current event $E_n$.

As mentioned above, A dust output is associated with a (digital asset) value that is below a defined limit for a transaction or having a defined minimum value. There may also be other inputs associated with digital assets based on an operational float. This float may be controlled by the platform processor. It is also possible to have other outputs in the transaction that are digital asset change outputs.

Thus, in some embodiments, an Update template for a blockchain transaction to update an event stream as per the present embodiment is one where the first input must be dust and the first output must be dust. This is to advantageously indicate the presence of a previous entry in the event stream. This also indicates that the event in question $E_n$ (the present or current event data) comes after the previous transaction or state of the smart contract SC. Thus, the transaction advantageously follows the dust chain and comes before the next state. The Update template includes a data carrier, i.e. a data output that carries the event data or a result associated with the current event or state. This may be an un-spendable OP_RETURN output.

The use of dust outputs in the transaction is advantageous for maintaining an immutable sequential record of all transactions as they occur for an event stream ES in the blockchain. This is because, although by posting transactions to the blockchain all blockchain transactions would be time-stamped and remain in order in the blockchain, this does not guarantee preservation of their sequential order. This is because transactions might be mined into blocks at different times. The use of a dust output of a previous transaction being spent as the first input of a current transaction, where the spend is based on respective unique keys pertaining to the locking/unlocking scripts of each transaction ensures a clear, sequential tamper proof record of the event stream in chronological order.

Step 412 depicts submitting the transaction $TX_n$ to the blockchain. Here the transaction may be submitted to the blockchain, such as the Bitcoin SV network for inclusion in a subsequent block by a miner node or BSV node software associated with the platform processor. In some embodiments, once mined, the transaction identifier may be used to uniquely identity the event stream ES or the smart contract SC.

Step 414 depicts sending a result associated with the created event stream ES in $TX_n$ to the client, the result being provided in the HTTP transmission protocol format. The result may be copied or saved separately to the blockchain. In some embodiments, this may be based on the event data in the final unspent transaction output ($UTXO_{n\_data}$). In some embodiments, the event data for the event $E_n$ in ($UTXO_{n\_data}$) includes a hash of said event data, thereby ensuring that this is kept private by the platform processor. The hash may be applied by the platform processor or be applied by the client, i.e. applied in some embodiments prior to generating the event data pertaining to the request that is received at the payment processor in step for the event $E_n$.

In the case of it being applied by the client, the event data in the request is private even before it reaches the platform processor. In other embodiments, the event data may be provided as raw data, publicly available from the blockchain.

FIG. 5 relates to terminate an existing smart contract and the corresponding event stream on the blockchain.

Step 502 depicts receiving a request from a client, the request relating to the termination of an existing smart contract SC that is associated with an event stream ES implemented using the blockchain. The request from the client being in a Hypertext Transfer Protocol (HTTP) transmission protocol format.

As discussed in relation to step 308 of FIG. 3, the event stream ES on the blockchain is associated with a key chain K such that $K=K_{n=0\ to\ N}$, where n is an integer from 0 to N, each integer n representing a current length or current number of events associated with the event stream ES, where N represents a maximum or final value of n. In some embodiments, authentication and authorization checks are performed, which may be a test for the presence of an API access token, or a session check or a password/digital signature test, or some other appropriate method to validating the client or the request made.

In step 504, the current state $ES_n$ n of the smart contract is determined. This is determined based on the event stream ES that is specific to the smart contract SC. The event stream ES is stored or implemented in the blockchain. In some cases, the current state of the smart contract SC may also be determined from a snapshot or log of the event stream ES that is be stored off chain. For instance, this log or snapshot database may be provided within the platform 100 in FIG. 1 or may be stored in a location from which is can be retrieved or accessed by the platform processor.

Step 506 depicts identifying or obtaining data associated with a final event $E_N$, this being the event to be currently added or appended to the event stream ES on the blockchain based on event data for the smart contract SC in the received request in step 502.

Step 508 includes identifying a previous blockchain transaction $TX_{N-1}$ associated with the event stream ES of the smart contract SC. Once identified, a key pair $K_{N-1}$ associated with the identified previous transaction $TX_{N-1}$ is then determined. As mentioned above, this is based on the same seed key pair K set out in step 504.

Step 510 depicts creating a current blockchain transaction $TX_N$ for the new event stream ES where n=N. In some embodiments, a key pair $K_N$ for the current event $E_N$ is derived from the seed key pair K. The blockchain transaction $TX_N$ created for the current event $E_N$ to terminate the event stream ES for the smart contract includes:
- a first input spending a dust output associated with the previous transaction $TX_{N-1}$, said spend authorised with the obtained key pair $K_{N-1}$ for the previous transaction obtained in step 508;
- a first unspent transaction output ($UTXO_N$) associated with a digital asset that is above a defined dust output limit.

For the final event in the event stream depicting the terminated state of the smart contract SC, all transaction outputs return change. There is no dust output as there is no requirement or need to track the next stage of the terminated event stream. Thus, no dust output is provided by the platform processor when n=N. In other words, the outputs may be considered as a change output (digital asset payment) associated with the event stream ES. This advantageously marks or indicates the final terminated state of the event stream being tracked. In some embodiments, there is also no event data or data carrier element, i.e. no OP_RETURN, for the output as the event or contract is in a terminated state. Thus, separate dust and data carrier outputs are not generated to terminate the event stream ES and the first output is above the dust limit to signal that this is the end of the event stream on the blockchain, along with the absence of a data output which also indicates termination. There may be other inputs or change outputs associated with a digital asset from an operational float. In some embodiments, the value of the digital asset associated with the dust set out in relation to FIGS. 3 and 4 may simply be added to the one or more other outputs.

Figure 6:
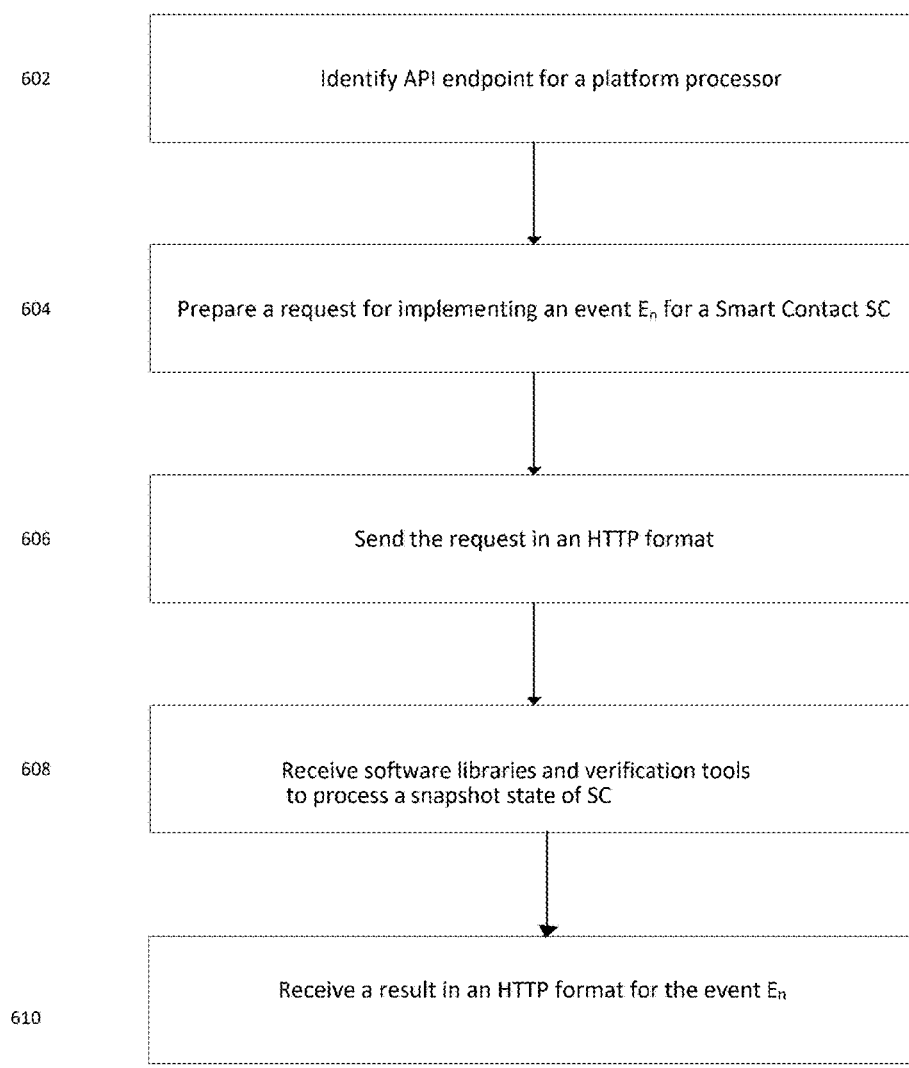
FIG. 6 is a flowchart, depicting a method for accessing a smart contract that is associated with a blockchain, according to a second aspect, as implemented by one or more processors associated with a client.

Thus, in some embodiments, a Close template for a blockchain transaction to terminate an event stream as per the present embodiment is one where the first input must dust be dust, like the first input of the Update template in FIG. 6. The first output must not be dust, and this advantageously acts as an end-of-ledger marker and furthermore distinguishes the Close template from the Update template. Like the Create template in FIG. 3, there is no data carrier such as the OP_RETURN in the Close template.

Step 512 depicts submitting the transaction $TX_N$ to the blockchain. Here the transaction may be submitted to the blockchain, such as the Bitcoin SV network for inclusion in a subsequent block by a miner node or BSV node software associated with the platform processor.

Step 514 depicts sending a result associated with the created event stream ES in $TX_N$ to the client, the result being provided in the HTTP transmission protocol format.

FIG. 6 relates to the second aspect of the present disclosure and depicts a computer implemented method for accessing a platform for executing a smart contract associated with a blockchain, such as the platform 100 shown in FIG. 1. The method of FIG. 6 is implemented by one or more processors associated with a client.

In step 602, the application programming interface (API) endpoint associated with the platform is identified. As mentioned before, this may be the API associated with a host platform processor, and there may be one or more further processors responsible for implementing the service, that each have a service endpoint or a destination address.

In step 604, the client prepares a request for a service, such as the compute service 104 in FIG. 1. The request is associated with one or more events $E_n$ pertaining to a smart contract SC. In some embodiments, the step includes applying a hash function to the event data associated with the event $E_n$ being requested, such that the request includes the hashed event data for the event $E_n$, instead of the raw data for added privacy and security.

The client in some embodiment includes a client alias or identifier and/or a service identifier in the request, so that the request can be routed to the correct endpoint, and so that the platform processor can check the validity of the requesting client and the client's permission to use the requested service.

In step 606, the request prepared in step 604 is sent using a Hypertext Transfer Protocol (HTTP) or similar transmission protocol format, as the platform processor is implemented as a HTTP or REST API. This may be managed and/or provided by a gateway service for the platform processor discussed above.

Step 608 includes obtaining one or more software libraries and verification tools for processing data associated with the smart contract SC. The software libraries may include functions that enable recovering a snapshot or an instance of the state of smart contract SC based on a replay or recovery of an event $E_n$ provided to the event stream ES associated with the smart contract SC. This may be provided in the form of a software development kit (SDK). The verification tools that are provided to the client with the SDK advantageously enable the client to compare any recovered or replayed snapshot of the smart contract with a respective stored or obtained instance of the event stream ES depicting the resulting state of the smart contract SC. This is to check that any outcome received by the client has not been tampered with, or that an incorrect outcome has not been provided to the client.

In step 610, a result based on a current state of the smart contract is then received. In some embodiments, the result received pertains to an output script of a blockchain transaction associated with the event $E_n$ in the request. This result is provided to the client in the HTTP transmission protocol format. In some embodiments, the result may identify the state of the smart contract as currently reflected in the event stream. The event stream ES associated with the latest event $E_n$ may be saved in a log or an event stream storage separately to the blockchain, either in or associated with the platform processor.

Advantageously, the software libraries in step 608 provide the client with the functionality to replay or recover a snapshot or instance of the smart contract SC based on a test input event $TE_n$ that pertains to a real or actual input event $E_n$ for the smart contract SC. The test input $TE_n$ may be based on the latest event $E_n$ that was processed by the platform, or may be an earlier input event $E_n$ provided by the client. This recovered snapshot based on that test event $TE_n$ can then be used to independently verify the state $ES_n$ of the smart contract, as recorded in the event stream ES for or following that corresponding real event $E_n$.

In some cases the client may already have executable code associated with the software of the smart contract SC, such that the client can run the software based on the test event $TE_n$. In other embodiments, the client may be able to directly invoke executable code associated with the smart contract SC via the platform processor without using any gateway services for the platform, i.e. the direct invocation may be via a remote procedure call (RPC). This is so that the client can invoke code to test or replay a given instance based on a given input event $E_n$, by using a corresponding test input $TE_4$. Thus, the software libraries allow a recreation of real events $E_n$ that are associated with the event stream ES for the smart contract SC for verification or audit purposes, The verification tools may include one or more software modules or code provided to the client which advantageously enables the client to compare the recreated or recovered snapshot with the state of the smart contract that is recorded on the (blockchain) transaction, i.e. associated with the event stream ES pertaining to the smart contract SC, for a given event $E_n$. Note that while it is not necessary for the real event $E_n$ being verified to be the latest event in the event stream $ES_n$ this is usually the most common case. Note that it is possible to provide a test input $TE_n$ based on any other earlier real event $E_n$ that has been taken place, and has already been provided to or written into the event stream ES.

In some embodiments, the verification tools also enable verification of the replayed or recovered event stream by a comparison with a current snapshot or state of the smart contract SC that may be stored off-chain, such as in an event log or the instance snapshot database, to verify if they match. In some embodiments, the verification tools may also enable the client to perform the comparison with the data directly associated with the event stream ES from the blockchain, if needed.

Therefore, in some embodiments, the verification tools in combination with the SDK (client libraries) associated with the client enable or perform the following steps:
- (a) Obtain executable code associated with the smart contract SC. In some examples, this may be based on a binary code that is already available to the client, or the client may invoke the latest version of the smart contract software directly via the executor platform.
- (b) Provide directly, i.e. without using the gateways or HTTPS APIs of the platform, a test input event $TE_A$, that is based on an actual or real event $E_n$ that has already taken place for the smart contract, and thus is already written into the blockchain. Thus, the test event $TE_n$ is the same as or based on a real event $E_n$ that that has been processed and stored on the blockchain in associated with the log, i.e. the event stream $ES_n$ for the smart contract. Thus, the verification tools have the functionality to directly invoke the contract software to replay the event stream ES to recover a snapshot or state of the smart contract SC based on the event $E_n$ that is being verified using a corresponding test input event $TE_A$.
- (c) Since the verification tools are configured to generally invoke the contract software based on test events instead of the real events that have already occurred, the executor platform 100 does not write data or invoke a data writing operation or service to record such test events $TE_n$ into the event stream ES associated with the smart contract SC. It is possible for a record of the test events invoked by the verification tools to be recorded in another off-chain log or store associated with either the client or the platform. No test events are however written into the blockchain, and the event stream only includes a clear indication of the sequence of real events $E_n$ for the smart contract SC that have occurred.

Advantageously, the implementation of an event stream and its sequential log associated with the blockchain to track the execution of a smart contract as implemented by the methods of the first and second aspect of the present disclosure offers guarantees relating to immutability of events and immutability of event sequencing for the smart contract. Once written, any attempt to tamper with the smart contract in any of the following ways is either prevented or made evident:

Changing the contents of an event
Re-ordering events
Inserting events at the start or middle of a stream
Removing events from anywhere in the stream In other words, the present disclosure makes the following attributes relating to the event stream that tracks the smart contract provable:

Individual entries in the event stream have not been modified since they were written
No entries have been inserted between previously contiguous entries
No entries have been removed
No entries have been re-ordered These properties and advantages have many practical applications, from audit/compliance logs, to state machine replication, to more efficient, tamper resistance and accurate methods for reading from and writing data into the blockchain for all clients.

Implementation Example

An example for an event stream for which capture of an event log such as the event stream ES would be useful is an application to track and record a smart contract SC that is configured for a game, such as Noughts O and Crosses X (or commonly known as tic-tac-toe) using the blockchain.

The following section walks through the construction of different types of smart contract in order to illustrate how particular outcomes may be delivered via platform services. The smart contract SC here is for the game of tic-tac-toe Tic-tac-toe is a paper-and-pencil game for two players, X and O, who take turns marking the spaces in a 3×3 grid. The player who succeeds in placing three of their marks in a horizontal, vertical, or diagonal row is the winner. In order to win the game, a player must place three of their marks in a horizontal, vertical, or diagonal row.

Figures 7, 7A:
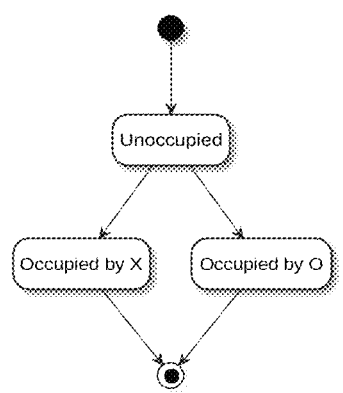
FIG. 7 is a schematic diagram, illustrating the execution of a game as an example of an execution of a smart contract.
FIG. 7a is a schematic diagram, illustrating a state machine for one state of an example smart contract.

An illustration of the game is seen in FIG. 7.

The game is played by two players, O and X. Players may be named and take turns to occupy cells until either a winning run of cells is constructed, or no such run of cells may be constructed.

Each cell is labelled by a coordinate pair A1, B1, B3, C3. A single cell may be either occupied or empty. Occupied cells must be occupied by a single player. The entire game may be modelled as a pair of nested state machines. The state machine for a single cell is seen in FIG. 7a.

Figure 7B:
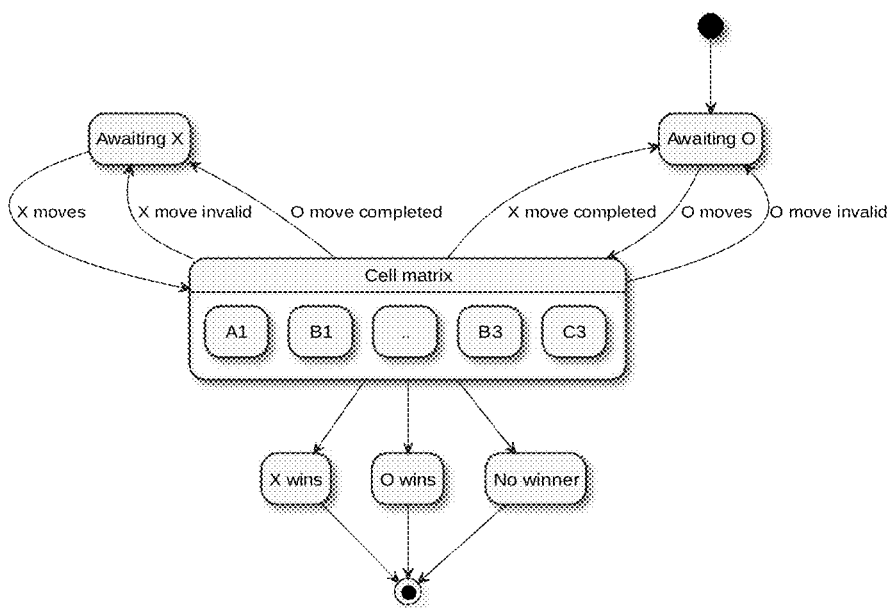
FIG. 7b is a schematic diagram, illustrating a state transition for a single event of an example smart contract.

The outer state machine, containing nine instances of the above cell state machine (A1 through C3) is seen in FIG. 7b A single play of the game may be represented by some initial metadata describing the players, followed by a log of the cells occupied in sequence. This provides enough data for the game to be replayed by any replica or entity or node, and for the outcome of the game to be independently verified.

The example game from earlier in this document, represented by its event stream may be illustrated as:

| Seq | Entry |
|---|---|
| 00 | O = Alice, X = Bob, Contract = 0x34476928 . . . |
| 01 | C1 |
| 02 | A1 |
| 03 | A3 |
| 04 | B2 |
| 05 | C3 |
| 06 | C2 |
| 07 | B3 |

Each entry in the above log would be an event $E_n$ in an Event Stream ES for then game (SC).

Alice and Bob could use custom client software such as mobile apps to interact with the platform services gateways. The gateways would interact with the underlying executor platform seen in FIG. 1b, which would arrange for the construction of a new Event Stream ES then have responsibility for feeding events into an appropriate smart contract program SC.

After each turn the event stream $ES_n$ encapsulated as a series of on-chain transactions, may be replicated or sent back to both Alice and Bob, in order to allow the local or client side applications to display the current state of the game $ES_n$. Alternatively, where the snapshot state of the game is small, the current state of the game may also be presented back to both players as it is updated.

Figure 8:
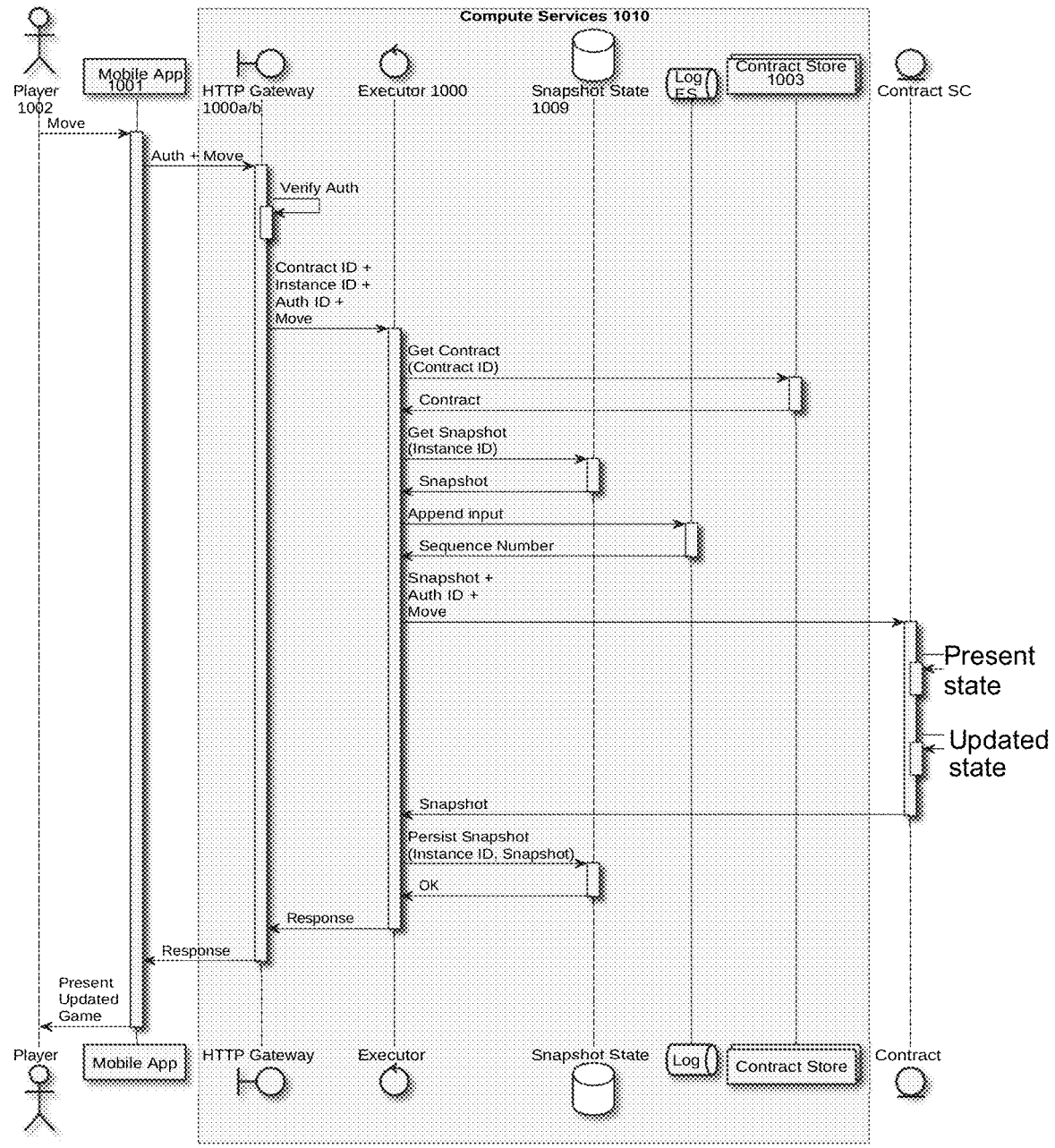
FIG. 8 is a sequence diagram, depicting data and/or process flow associated with an event for an example smart contract.

The process of making a move by a player in the game is set out in details the sequence flow diagram in FIG. 8.

There are no explicit messages shown as being sent to the other players in this example, but this may be present. Internal messaging is omitted to simplify the above diagram. Event Streams for smart contract enable the feature of observer replication of the events of the contract. Thus any authorised entity may subscribe to notifications for a given event stream ES to receive updates. Similarly snapshot notifications may be added, but is not shown in the above.

Using the same example of the tic-tac-toe, the following provides an example of the provision of an immutable tamper-proof log of sequential events for the smart contract SC using the event stream ES.

Consider the game up to n=4 (5 states from 0 to 4 for the smart contract, i.e. game) is in the following state:

|   | A | B | C |
|---|---|---|---|
| 1 | O |   | O |
| 2 |   | O |   |
| 3 | X |   | X |

As the game proceeds, by the method of the third aspect, a log based on the output of the blockchain transactions may be recorded as follows:

| 0 | B2 |
|---|----|
| 1 | A3 |
| 2 | A1 |
| 3 | C3 |
| 4 | C1 |

Consider that there is an attempt to tamper with or change a copy of a log this is maintained for this sequence, such as insert a different entry for the result when n=4 so that the log does not reflect the actual state of the game—as given below:

| 0 | B2 |
|---|----|
| 1 | A3 |
| 2 | A1 |
| 3 | C3 |
| *4* | *B3* |
| 4 | ~~C1~~ |

This will be immediately identified from a check or audit of the automatically generated sequential log of the event stream on the blockchain, as the input of the transaction that spends the dust output for a transaction where n=3 will not be validated. It will be appreciated that where such games involve financial transactions (e.g. pay to play), there may be a desire from players to check the veracity of their game logs and whether or not a given games provider is adhering to the odds or difficulty that they are advertising. By storing individual game entries (or hashes thereof) for a given game in an event stream ES as described above, players can be assured that in-game events can be checked and verified independently of any internal system maintained by the games provider.

It will be further appreciated that each event in a given event stream need not correspond to individual events occurring within a gaming session. An event stream may be defined for any log of events where an accurate, sequential, tamper-proof log of said events is desirable. Examples of events in a given event stream may include, e.g. inputs and/or outputs of a given smart-contract being executed locally or remotely (preferably off-chain); messages sent between two or more participants of a given online messaging conversation; physical measurements performed by sensors or IoT devices for measuring e.g. weather, locations of e.g. vehicles, goods, people, etc.; drug/medicine tracking—including e.g. source of manufacture, transportation, dispenser location, prescribed dosage, recipient information, etc.; financial transactions, such as e.g. an amount an account is credited and/or debited (regardless of whether the account is credited with cryptocurrency or fiat), changes in exchange rate, execution of trades, requests for the purchasing of goods or shares, etc. Ultimately, the context in which the event stream is generated and used will be at the leisure of the party using the platform processor to generate such an event stream.

Figure 9:
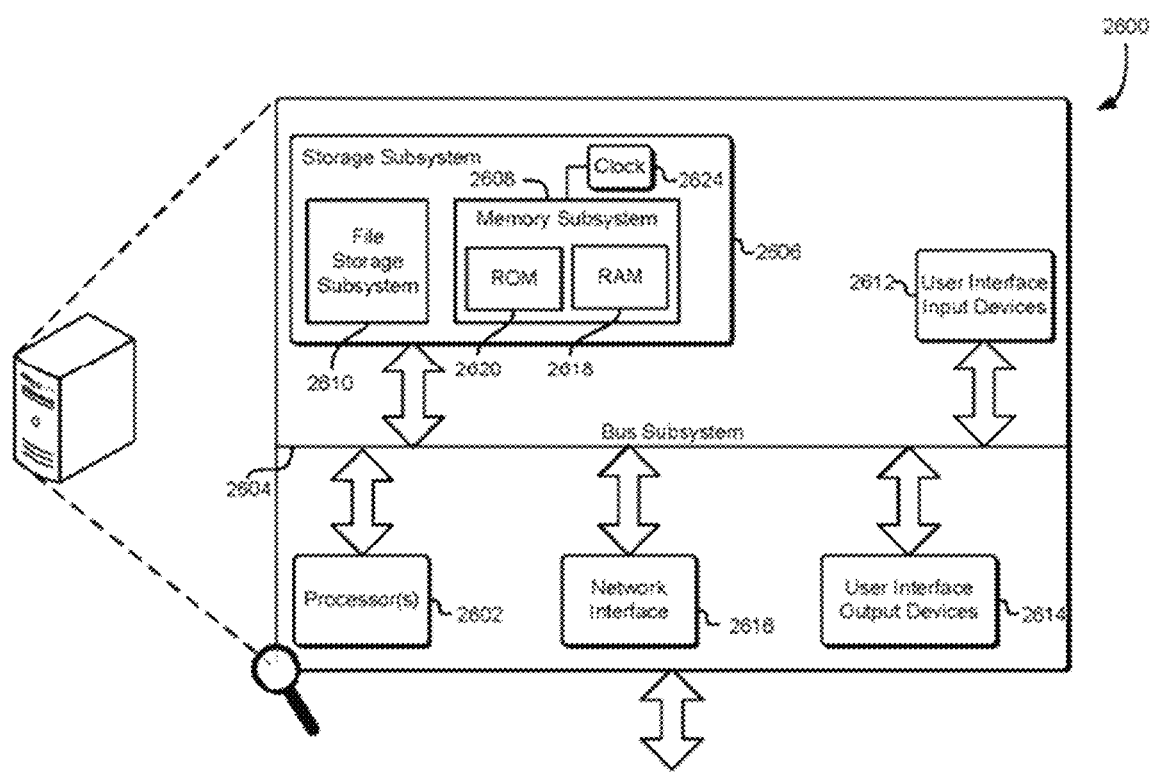
FIG. 9 is a schematic diagram, illustrating a computing environment in which various aspects and embodiments of the present disclosure can be implemented.

Turning now to FIG. 9, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 9. Thus, computing device 2600 may be a portable computing device, a personal computer, or any electronic computing device. As shown in FIG. 9, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 9 is intended only as a specific example for purposes of illustrating the preferred embodiment of the device. Many other configurations having more or fewer components than the system depicted in FIG. 9 are possible.

Enumerated Example Embodiments

The present disclosure is hereby discussed based on the following clauses that are related to the above aspects, which are provided herein as exemplary embodiments for better explaining, describing and understanding the claimed aspects and embodiments.

1. A computer implemented method for enabling the execution of one or more smart contracts associated with a blockchain, the method implemented by a platform processor associated with an application programming interface (API), the method comprising the steps of:
   receiving a request from a client, the request relating to a smart contract (SC), the request from the client being based on a Hypertext Transfer Protocol (HTTP) transmission protocol format;
   accessing the smart contract SC pertaining to the request;
   identifying an event stream (ES) associated with the blockchain, the event stream ES being specific to the smart contract SC, the event stream representing the states of the smart contract SC;
   determining a current state $ES_n$ of the smart contract SC based on the identified event stream $ES_n$, wherein n is an integer from 0 to N, each integer n representing a current state or current number of events associated with the smart contract SC, and N represents a maximum or final value or state of n;
   invoking execution of the smart contract SC based on the received request;
   invoking updating the event stream ES pertaining to the smart contract SC by the steps including:
   processing a new event $E_n$ based on the received request; and
   obtaining an updated current state of the smart contract $ES_{n+1}$ based on the new event $E_n$; and storing or providing a result based on the updated current state $ES_{n+1}$ for the smart contract.

2. The method as set out in in clause 1, wherein the step of invoking execution of the smart contract SC further comprises:
   obtaining an identifier specific to the smart contract SC from the received request;
   based on the identifier, accessing the given smart contract SC from a contract store;
   providing the smart contract SC to one or more processors for executing one or more software routines or programming instructions associated with the smart contract.

3. The method as set out in in clauses 1 or 2 wherein based on a determination that n=0, the step of processing a new event $E_n$ includes the steps of:
   identifying the new event $E_n$ for the smart contract SC in the received request as a first event to create the respective event stream ES pertaining to the smart contract SC;
   processing the received event $E_n$ by creating a blockchain transaction $TX_0$ including a first unspent output $UTXO_{0\_dust}$ that is a dust output.
   submitting the transaction $TX_0$ to the blockchain; and
   providing a result associated with the updated event stream ES.

4. The method as set out in in clause 3 wherein the blockchain transaction $TX_0$ includes an identifier or a hash of the smart contract SC.

5. The method as set out in in clauses 1 or 2 wherein based on a determination that 0<n<N, the step of processing a new event $E_n$ includes the steps of:
   identifying the new event $E_n$ for the smart contract SC in the received request as a current event to amend the respective event stream ES pertaining to the smart contract SC; processing the received event $E_n$ by creating a blockchain transaction $TX_n$ including:

a first input spending a dust output associated with a previous transaction for the event stream ES;

a first unspent transaction output $UTXO_{n\_dust}$ being a dust output; and a final unspent transaction output $UTXO_{n\_data}$ associated with event data representing the current event $E_n$;

submitting the transaction $TX_n$ to the blockchain; and providing a result associated with the updated event stream ES.

6. The method as set out in in clause 5 where the event data for the event $E_n$ in the final unspent transaction output ($UTXO_{n\_data}$) for the current blockchain transaction $TX_n$ includes a hash of said event data.

7. The method as set out in in clause 6 where the hash of said event data is applied by the platform processor.

8. The method as set out in in clause 6 where the hash of said event data is applied by the client prior to being included in the request that is received by the platform processor.

9. The method as set out in in clause 6 where the event data for the event $E_n$ in the final unspent transaction output ($UTXO_{n\_data}$) for the current blockchain transaction $TX_n$ includes raw event data.

10. The method as set out in in clauses 1 or 2 wherein based on a determination that that n=N, the step of processing a new event $E_n$ includes the steps of:

identifying the new event $E_n$ for the smart contract SC in the received request as a final event to terminate the event stream ES;

processing the received event $E_n$ by creating a blockchain transaction $TX_N$ including:

a first input spending a dust output associated with a previous transaction for the event stream ES; and a final unspent output $UTXO_N$ that is associated with a digital asset that is more than a defined dust output value;

submitting the created transaction $TX_N$ to the blockchain; and providing a result associated with the event stream ES in $TX_N$.

11. The method as set out in in any one of clauses 3 to 10 wherein the step of submitting comprises including the created transaction in a subsequent block associated with the blockchain to be mined.

12. The method as set out in in any one of clauses 3 to 11 comprising the step of identifying the event stream ES based on a transaction identifier associated with the submitted blockchain transaction.

13. The method as set out in in any one of clauses 3 to 12 comprising the step of identifying a state of the smart contract SC based on a transaction identifier associated with the submitted blockchain transaction.

14. The method as set out in in any one of clauses 3 to 13 wherein the created blockchain transaction further comprises:

an input associated with a digital asset; and one or more change outputs associated with the digital asset.

15. The method as set out in in clause 14 wherein the digital asset is associated with an operational float.

16. The method as set out in in any one of clause 3 to 15 including the step of determining a hierarchical deterministic key chain K to be used with the event stream ES pertaining to the smart contract SC, wherein the key chain K includes a series of private/public key pairs derived from a selected parent key pair, such that $K=K_{n=0\ to\ N}$.

17. The method as set out in in any preceding clause wherein the step of invoking updating the event stream ES pertaining to the smart contract further includes the step of accessing a data writer associated with the platform processor for processing the new event $E_n$.

18. The method as set out in in any one of the preceding clauses wherein the result is a snapshot state of the smart contract SC, said result being stored in and/or accessible from an instance state database associated with the platform processor.

19. The method as set out in in any one of the preceding clauses wherein the result is provided to the client based on the HTTP transmission protocol format.

20. The method as set out in in any preceding clause wherein the result associated with the current state $ES_n$ of the smart contract SC includes a certificate confirming at least one of the following:

a transaction identifier within which the event $E_n$ was submitted to the blockchain;

a Merkle inclusion proof of the transaction to a header in the blockchain a copy of the block header in which said transaction was included 21. The method as set out in in any preceding clause wherein the smart contract SC is implemented as a Finite State Machine (FSM).

22. The method as clamed in any preceding clause comprising storing a copy or a record or a log that is based on the result(s) for each event of the event stream ES for the smart contract SC in an off-chain storage resource.

23. The method as set out in in any preceding clause wherein the API is a Hyper Text Transfer Protocol (HTTP) Application programming Interface (API) endpoint, and wherein said endpoint is provided to the client using HTTP Secure (HTTPS).

24. The method as set out in in any one of clauses 1 to 23 wherein the API is an alias associated with the platform processor, the alias being specific to the platform processor and provided by an alias-based addressing service, the addressing service having a machine readable resource that is accessible from a defined or well-known location, the machine readable resource including one or more capabilities pertaining to the platform processor, and wherein the alias is associated with an asymmetric cryptographic key pair for authentication.

25. The method as set out in in any preceding clause wherein responsive to receiving the request from the client, the method comprises the step of providing one or more software libraries and/or verification tools for processing data associated with the smart contract SC associated with the request.

26. A computer implemented method for accessing a smart contract associated with a blockchain, the method implemented by one or more processors of a given client among a plurality of clients, the method comprising the steps of:

obtaining or identifying an application programming interface (API) endpoint associated with one or more processors associated with a platform for executing a smart contract SC; sending a request for one or more events $E_n$ pertaining to the smart contract SC to the platform, wherein the request is sent based on a Hypertext Transfer Protocol (HTTP) transmission protocol format;

obtaining one or more software libraries and verification tools for processing data associated with the smart contract SC; and receiving a result based on an output script of a blockchain transaction pertaining to the requested event $E_n$, said result representing an updated state of the smart contract SC, the result being received using a HTTP transmission protocol format.

27. The method as set out in in clause 26 comprising applying a hash function to event data for the event $E_n$, such that the request includes the hashed event data for the event $E_n$.

28. The method as set out in in clause 26 or 27 further comprising the steps of: based on the result, recovering the event stream ES associated with the smart contract SC using the one or more software libraries;

using the one or more verification tools, comparing the recovered event stream ES to the result to verify the state of the smart contract.

29. The method as set out in in any one of clauses 26 to 28 wherein the one or more software libraries are associated with a software development kit (SDK) received from the platform.

30. The method as set out in in any one of clauses 26 to 27 wherein the client is associated with an alias associated with the platform processor, the alias being specific to the platform processor and provided by an alias-based addressing service, the addressing service having a machine readable resource that is accessible from a defined or well-known location, the machine readable resource including one or more capabilities pertaining to the client, and wherein the alias is associated with an asymmetric cryptographic key pair for authentication.

31. A computing device comprising a processor and memory, the memory including executable instructions that, as a result of execution by the processor, causes the device to perform the computer-implemented method as set out in in any one of clauses 1 to 25, the computing device pertaining to a platform processor.

32. A computing device comprising a processor and memory, the memory including executable instructions that, as a result of execution by the processor, causes the device to perform the computer-implemented method as set out in in any one of clauses 26 to 3-, wherein the computing device is pertaining to a client.

33. A computer system comprising:
at least one platform processor communicatively coupled to at least one client via a wireless communication network, the at least one platform processor associated with an application programming interface (API) endpoint for processing HTTP requests from the at least one client, the at least one platform processor implemented in accordance with the computing device as set out in in clause 31; and the at least one client being implemented in accordance with the computing device as set out in in clause 32, wherein the at least one platform processor is communicatively coupled via the wireless communication network to one of more of the following components of a platform service, the platform service providing a plurality of services associated with a blockchain for a plurality of clients:
a smart contract store;
an event stream log;
an instance state database; and
a data writer;

34. A computer-readable storage medium having stored thereon executable instructions that, as a result of being executed by a processor of a computer, cause the computer to perform the method of any one of clauses 1 to 30.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method for enabling execution of one or more smart contracts associated with a blockchain, the method implemented by a platform processor associated with an application programming interface (API), the method comprising the steps of:
receiving a request from a client, the request relating to a smart contract (SC), the request from the client being based on a Hypertext Transfer Protocol (HTTP) transmission protocol format;
accessing the smart contract SC pertaining to the request;
identifying an event stream(ES) associated with the blockchain and implemented as a sequence of linked blockchain transactions, the event stream ES being specific to the smart contract SC, the event stream representing states of the smart contract SC;
determining a current state $ES_n$ of the smart contract SC based on the identified event stream ES, wherein n is an integer from 0 to N, each integer n representing the current number of events in the event stream ES, and N represents a maximum or final value or state of n;
invoking execution of the smart contract SC based on the received request;
invoking updating the event stream ES pertaining to the smart contract SC by the steps including:
processing a new event $E_n$ based on the received request; and
obtaining an updated current state of the smart contract $ES_{n+1}$ based on the new event $E_n$; and
storing or providing a result based on the updated current state $ES_{n+1}$ for the smart contract.

2. The method of claim 1, wherein the step of invoking execution of the smart contract SC further comprises:
obtaining an identifier specific to the smart contract SC from the received request;
based on the identifier, accessing the given smart contract SC from a contract store;

providing the smart contract SC to one or more processors for executing one or more software routines or programming instructions associated with the smart contract.

3. The method of claim 1, wherein based on a determination that n=0, the step of processing the new event $E_n$ includes the steps of:
identifying the new event $E_n$ for the smart contract SC in the received request as a first event to create the respective event stream ES pertaining to the smart contract SC;
processing the received event $E_n$ by creating a blockchain transaction $TX_0$ including a first unspent output $UTXO_{0\_dust}$ that is a dust output;
submitting the transaction $TX_0$ to the blockchain; and
providing a result associated with the updated event stream ES.

4. The method of claim 3, wherein the blockchain transaction $TX_0$ includes an identifier or a hash of the smart contract SC.

5. The method of claim 1, wherein based on a determination that 0<n<N, the step of processing the new event $E_n$ includes the steps of:
identifying the new event $E_n$ for the smart contract SC in the received request as a current event to amend the respective event stream ES pertaining to the smart contract SC;
processing the received event $E_n$ by creating a blockchain transaction $TX_n$ including:
a first input spending a dust output associated with a previous transaction for the event stream ES;
a first unspent transaction output $UTXO_{n\_dust}$ being a dust output; and
a final unspent transaction output $UTXO_{n\_data}$ associated with event data representing the current event $E_n$;
submitting the transaction $TX_n$ to the blockchain; and
providing a result associated with the updated event stream ES.

6. The method of claim 5, wherein the event data for the event $E_n$ in the final unspent transaction output ($UTXO_{n\_data}$) for the current blockchain transaction $TX_n$ includes a hash of the event data.

7. The method of claim 6, wherein the hash of the event data is applied by the platform processor.

8. The method of claim 6, wherein the hash of the event data is applied by the client prior to being included in the request that is received by the platform processor.

9. The method of claim 6, wherein the event data for the event $E_n$ in the final unspent transaction output ($UTXO_{n\_data}$) for the current blockchain transaction $TX_n$ includes raw event data.

10. The method of claim 1, wherein, based on a determination that n=N, the step of processing the new event $E_n$ includes the steps of:
identifying the new event $E_n$ for the smart contract SC in the received request as a final event to terminate the event stream ES;
processing the received event $E_n$ by creating a blockchain transaction $TX_N$ including:
a first input spending a dust output associated with a previous transaction for the event stream ES; and
a final unspent output $UTXO_N$ that is associated with a digital asset that is more than a defined dust output value;
submitting the created transaction $TX_N$ to the blockchain; and
providing a result associated with the event stream ES in $TX_N$.

11. The method of claim 3, wherein the step of submitting comprises including the created transaction in a subsequent block associated with the blockchain to be mined.

12. The method of claim 3, comprising the step of identifying the event stream ES based on a transaction identifier associated with the submitted blockchain transaction; or comprising the step of identifying a state of the smart contract SC based on a transaction identifier associated with the submitted blockchain transaction.

13. The method of claim 3, wherein the created blockchain transaction further comprises:
an input associated with a digital asset, wherein optionally the digital asset is associated with an operational float; and
one or more change outputs associated with the digital asset.

14. The method of claim 3, including the step of determining a hierarchical deterministic key chain K to be used with the event stream ES pertaining to the smart contract SC, wherein the key chain K includes a series of private/public key pairs derived from a selected parent key pair, such that $K=K_{n=0\ to\ N}$.

15. The method of claim 1, wherein the step of invoking updating the event stream ES pertaining to the smart contract further includes the step of accessing a data writer associated with the platform processor for processing the new event $E_n$.

16. The method of claim 1, wherein:
the result is a snapshot state of the smart contract SC, said result being stored in or accessible from an instance state database associated with the platform processor; or
the result is provided to the client based on the HTTP transmission protocol format; or
the result associated with the current state $ES_n$ of the smart contract SC includes a certificate confirming at least one of:
a transaction identifier within which the event $E_n$ was submitted to the blockchain,
a Merkle inclusion proof of the transaction to a header in the blockchain, or
a copy of a block header in which said transaction was included.

17. The method of claim 1, comprising storing a copy or a record or a log that is based on result(s) for each event of the event stream ES for the smart contract SC in an off-chain storage resource.

18. The method of claim 1, wherein the API is a Hyper Text Transfer Protocol (HTTP) Application programming Interface (API) endpoint, and wherein said HTTP API endpoint is provided to the client using HTTP Secure (HTTPS).

19. The method of claim 1, wherein the API is an alias associated with the platform processor, the alias being specific to the platform processor and provided by an alias-based addressing service, the addressing service having a machine readable resource that is accessible from a defined or well-known location, the machine readable resource including one or more capabilities pertaining to the platform processor, and wherein the alias is associated with an asymmetric cryptographic key pair for authentication.

20. The method of claim 1, wherein responsive to receiving the request from the client, the method comprises the step of providing one or more software libraries or verification tools for processing data associated with the smart contract SC associated with the request.

21. A computer program product comprising executable instructions stored in a non-transitory computer readable medium that, as a result of execution by a processor, causes the processor to perform a computer-implemented method for enabling the execution of one or more smart contracts associated with a blockchain, the method implemented by a platform processor associated with an application programming interface (API), the method comprising the steps of:
- receiving a request from a client, the request relating to a smart contract (SC), the request from the client being based on a Hypertext Transfer Protocol (HTTP) transmission protocol format;
- accessing the smart contract SC pertaining to the request;
- identifying an event stream(ES) associated with the blockchain and implemented as a sequence of linked blockchain transactions, the event stream ES being specific to the smart contract SC, the event stream representing states of the smart contract SC;
- determining a current state $ES_n$ of the smart contract SC based on the identified event stream ES, wherein n is an integer from 0 to N, each integer n representing the current number of events in the event stream ES, and N represents a maximum or final value or state of n;
- invoking execution of the smart contract SC based on the received request;
- invoking updating the event stream ES pertaining to the smart contract SC by the steps including:
  - processing a new event $E_n$ based on the received request; and
  - obtaining an updated current state of the smart contract $ES_{n+1}$ based on the new event $E_n$; and
- storing or providing a result based on the updated current state $ES_{n+1}$ for the smart contract.

* * * * *